(12) United States Patent
Alladi et al.

(10) Patent No.: US 8,849,941 B2
(45) Date of Patent: Sep. 30, 2014

(54) VIRTUAL DESKTOP CONFIGURATION AND OPERATION TECHNIQUES

(75) Inventors: Mahadeva Alladi, Sammamish, WA (US); Sriram Sampath, Redmond, WA (US); Ido Ben-Shachar, Kirkland, WA (US); Dustin L. Green, Redmond, WA (US); Ashwin Palekar, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 365 days.

(21) Appl. No.: 12/895,648

(22) Filed: Sep. 30, 2010

(65) Prior Publication Data

US 2012/0084381 A1 Apr. 5, 2012

(51) Int. Cl.
*G06F 15/167* (2006.01)
*G06F 9/54* (2006.01)

(52) U.S. Cl.
CPC ..................... *G06F 9/544* (2013.01)
USPC ........... 709/213; 709/203; 709/220; 709/223; 709/227; 711/153; 711/173; 719/319

(58) Field of Classification Search
CPC ............ G06F 9/45558; G06F 9/45533; G06F 9/5077; G06F 2009/4557; G06F 2009/45583; G06F 2009/45587; G06F 9/45545; Y02B 60/167; G06T 1/60; H04L 67/14; H04L 67/34
USPC ................ 709/213, 220, 227, 203, 223, 228; 711/173, 153; 718/1; 719/319
See application file for complete search history.

(56) References Cited

U.S. PATENT DOCUMENTS

| 7,680,643 | B2 | 3/2010 | Ragnunath et al. |
| 7,689,800 | B2 * | 3/2010 | Oshins et al. ................. 711/173 |
| 2007/0101323 | A1 | 5/2007 | Foley et al. |
| 2007/0130305 | A1 | 6/2007 | Piper et al. |
| 2007/0198976 | A1 | 8/2007 | Leis et al. |
| 2007/0244967 | A1 | 10/2007 | Ben-Shachar |
| 2008/0189697 | A1 | 8/2008 | Kachroo et al. |
| 2008/0228865 | A1 | 9/2008 | Cruzada |
| 2009/0006537 | A1 | 1/2009 | Palekar et al. |
| 2010/0058194 | A1 | 3/2010 | Owen |
| 2010/0070978 | A1 | 3/2010 | Chawla et al. |
| 2010/0121975 | A1 | 5/2010 | Sinha et al. |
| 2012/0023507 | A1 * | 1/2012 | Travis ........................... 719/319 |
| 2012/0079393 | A1 * | 3/2012 | Raithinam et al. ............ 715/744 |
| 2012/0079607 | A1 * | 3/2012 | Lal et al. ........................ 726/29 |

FOREIGN PATENT DOCUMENTS

CN 101313277 A 11/2008

OTHER PUBLICATIONS

"Windows 7—XP Mode", McAfee Research Blog, Jan. 6, 2010, 3 pages.

(Continued)

*Primary Examiner* — Oanh Duong
(74) *Attorney, Agent, or Firm* — Jim Sfekas; Kate Drakos; Micky Minhas

(57) ABSTRACT

Techniques for configuring and operating a virtual desktop session are disclosed herein. In an exemplary embodiment, an inter-partition communication channel can be established between a virtualization platform and a virtual machine. The inter-partition communication channel can be used to configure a guest operating system to conduct virtual desktop sessions and manage running virtual desktop sessions. In addition to the foregoing, other techniques are described in the claims, the detailed description, and the figures.

20 Claims, 12 Drawing Sheets

(56) References Cited

OTHER PUBLICATIONS

Carbone et al., "Hyper-V Overview", Chapter 2, www.virtualizationadmin.com-articles-tutorials-general-virtualization-articles-chapter-2-hyper-v-overview.html, VirtualizationAdmin.com, accessed Jul. 27, 2010, 43 pages.

Smith, "Virtual Desktop Infrastructure in Windows Server 2008 R2", FedTech Magazine, Mar. 4, 2010, 6 pages.

\* cited by examiner

VIRTUAL DESKTOP CONFIGURATION AND OPERATION TECHNIQUES

BACKGROUND

Virtual machine platforms enable simultaneous execution of multiple guest operating systems on a physical machine by running each operating system within its own virtual machine. One exemplary service that can be offered in a virtual machine is a virtual desktop session. A virtual desktop session is essentially a personal computer environment run within a virtual machine; however, the graphical user interface for the guest operating system is sent to a remote client. This architecture is similar to a remote desktop environment; however instead of having multiple users simultaneously connect to the same operating system, each user is given their own guest operating system.

Many customers are deploying virtual desktop sessions in order to reduce the total cost of ownership of desktop deployments. For example, virtual desktop sessions allow a customer, e.g., a company, to purchase computer systems that have cheap hardware and very little local software because the software is executed on the virtual desktop host, e.g., a virtual desktop server. Furthermore, since the virtual desktops are controlled from a central location, administrators have an easier time accessing and managing the servers from the central location. One of the main problems with deploying virtual desktop environments is that the virtual machines need to be pre-configured with multiple settings before they can be accessed by a remote client. Some of these configuration steps are tedious and are difficult to effectuate because guest operating systems lack a way of being remotely configured. Configuring a couple of virtual desktops manually or via customized scripts is annoying; configuring thousands of virtual machines this way is an administrative nightmare. Accordingly, techniques for configuring and controlling virtual desktops are desirable.

SUMMARY

An exemplary embodiment describes a computer system configured to deploy a virtual desktop session. In the illustrated embodiment, the computer system can include, but is not limited to, a logical processor coupled to a computer readable storage medium. The computer readable storage medium in this exemplary embodiment can include, but is not limited to, instructions that upon execution by a logical processor cause a virtualization platform to establish an inter-partition communication channel to a virtual machine including a guest operating system, wherein the virtual machine is configured to automatically trust messages received via the inter-partition communication channel without authenticating the messages; instructions that upon execution by a logical processor cause a virtualization platform to send, via the inter-partition communication channel, virtual desktop configuration information to the virtual machine; instructions that upon execution by a virtual processor in the virtual machine cause a virtual desktop configuration service to configure the guest operating system in accordance with the received virtual desktop configuration information; and instructions that upon execution by the virtual processor in the virtual machine cause the guest operating system to establish a virtual desktop session with a client. In addition to the foregoing, other techniques are described in the claims, the detailed description, and the figures.

In addition to a computer system, an exemplary embodiment provides a computer-readable storage medium including executable instructions for deploying a virtual desktop. In this example, the computer-readable storage medium includes, but is not limited to instructions that upon execution by a logical processor cause a virtualization platform to execute a guest operating system within a virtual machine; instructions that upon execution by the logical processor cause the virtualization platform to establish a shared region of memory that is shared between a virtualization platform and the virtual machine; instructions that upon execution by a virtual processor cause a virtual desktop session to be established between the virtual machine and a client; and instructions that upon execution by the logical processor cause the virtualization platform to manage the virtual desktop session by sending commands to the virtual machine via the shared region of memory. In addition to the foregoing, other techniques are described in the claims, the detailed description, and the figures.

In yet another example embodiment, an operational procedure is provided for deploying virtual desktop sessions. In this example, the operational procedure includes, but is not limited to executing a host operating system, wherein the host operating system is assigned to a first network domain; instantiating, by a hypervisor, a virtual machine including a guest operating system; establishing a shared region of memory between the host operating system and the virtual machine; connecting named pipe endpoints to the shared region of memory; starting a virtual desktop session between the guest operating system and a client wherein the guest operating system is assigned to second network domain; and sending, by the host operating system, commands to control the virtual desktop session to the virtual machine via the first named pipe interface. In addition to the foregoing, other techniques are described in the claims, the detailed description, and the figures.

It can be appreciated by one of skill in the art that one or more various aspects described herein may include but are not limited to circuitry and/or programming for effecting the herein-referenced aspects; the circuitry and/or programming can be virtually any combination of hardware, software, and/or firmware configured to effect the herein-referenced aspects depending upon the design choices of the system designer.

The foregoing is a summary and thus contains, by necessity, simplifications, generalizations and omissions of detail. Those skilled in the art will appreciate that the summary is illustrative only and is not intended to be in any way limiting.

DETAILED DESCRIPTION

Figure 1:
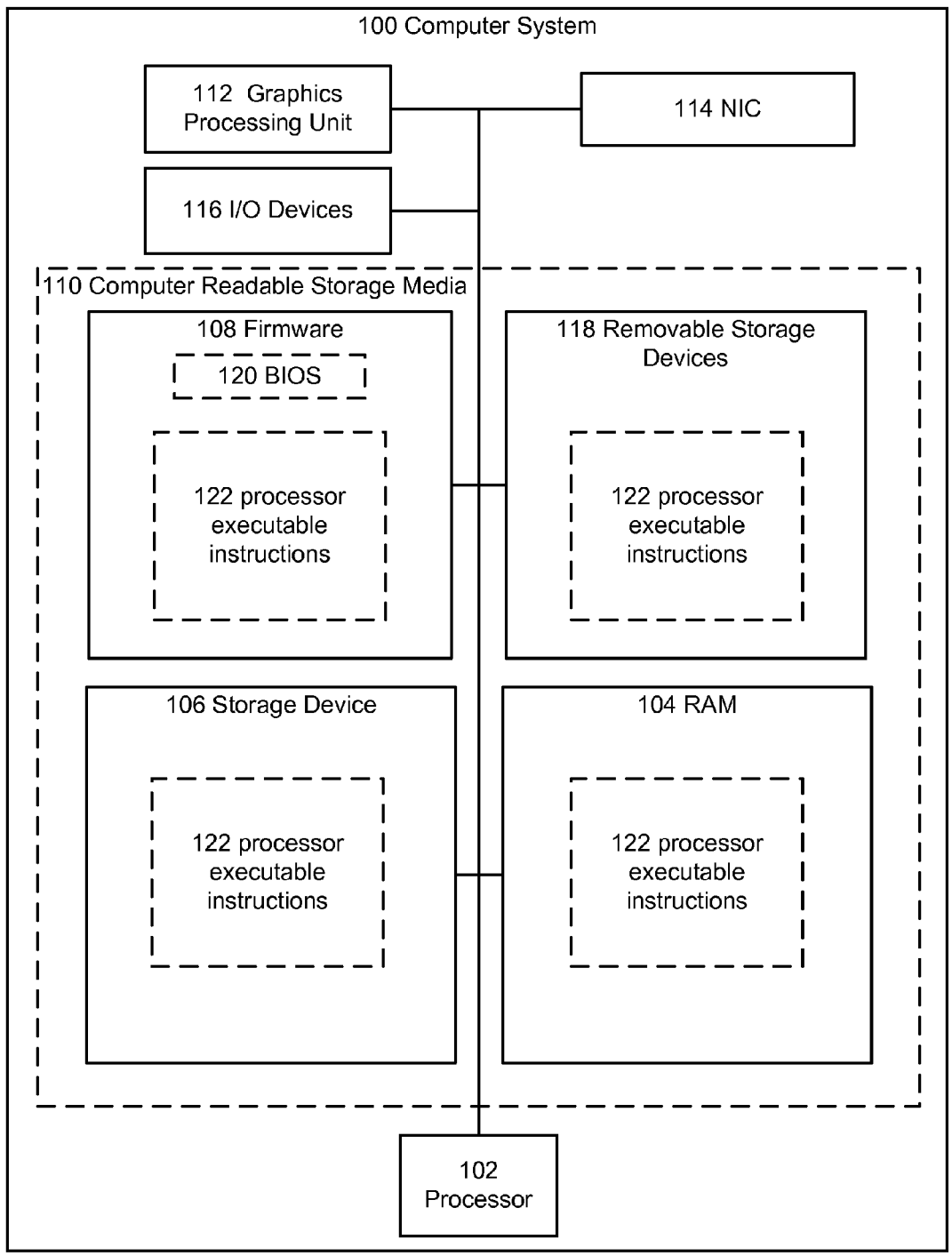
FIG. 1 depicts an example computer system.

The disclosed subject matter may use one or more computer systems. FIG. 1 and the following discussion are intended to provide a brief general description of a suitable computing environment in which the disclosed subject matter may be implemented.

The term circuitry used throughout can include hardware components such as hardware interrupt controllers, hard drives, network adaptors, graphics processors, hardware based video/audio codecs, and the firmware used to operate such hardware. The term circuitry can also include microprocessors, application specific integrated circuits, and a processor, e.g., a core (a unit that reads and executes instructions) of a multi-core general processing unit, configured by firmware and/or software. Processor(s) can be configured by instructions loaded from memory, e.g., RAM, ROM, firmware, and/or mass storage, embodying logic operable to configure the logical processor to perform a function(s). In an example embodiment, where circuitry includes a combination of hardware and software, an implementer may write source code embodying logic that is subsequently compiled into machine readable code that can be executed by hardware. Since one skilled in the art can appreciate that the state of the art has evolved to a point where there is little difference between hardware implemented functions or software implemented functions, the selection of hardware versus software to effectuate herein described functions is merely a design choice. Put another way, since one of skill in the art can appreciate that a software process can be transformed into an equivalent hardware structure, and a hardware structure can itself be transformed into an equivalent software process, the selection of a hardware implementation versus a software implementation is left to an implementer.

Referring now to FIG. 1, an exemplary computing system 100 is depicted. Computer system 100 can include processor 102, e.g., an execution core. While one processor 102 is illustrated, in other embodiments computer system 100 may have multiple logical processors, e.g., multiple execution cores per processor substrate and/or multiple processor substrates that could each have multiple execution cores. As shown by FIG. 1, various computer-readable storage media 110 can be interconnected by one or more system busses which couples various system components to the logical processor 102. The system buses may be any of several types of bus structures including a memory bus or memory controller, a peripheral bus, and a local bus using any of a variety of bus architectures. In example embodiments the computer-readable storage media 110 can include for example, random access memory (RAM) 104, storage device 106, e.g., electromechanical hard drive, solid state hard drive, etc., firmware 108, e.g., FLASH RAM or ROM, and removable storage devices 118 such as, for example, CD-ROMs, floppy disks, DVDs, FLASH drives, external storage devices, etc. It should be appreciated by those skilled in the art that other types of computer-readable storage media can be used such as magnetic cassettes, flash memory cards, and/or digital video disks.

The computer-readable storage media 110 can provide non volatile and volatile storage of processor executable instructions 122, data structures, program modules and other data for the computer 100. A basic input/output system (BIOS) 120, containing the basic routines that help to transfer information between elements within the computer system 100, such as during start up, can be stored in firmware 108. A number of programs may be stored on firmware 108, storage device 106, RAM 104, and/or removable storage devices 118, and executed by logical processor 102 including an operating system and/or application programs.

Commands and information may be received by computer 100 through input devices 116 which can include, but are not limited to, a keyboard and pointing device. Other input devices may include a microphone, joystick, game pad, scanner or the like. These and other input devices are often connected to logical processor 102 through a serial port interface that is coupled to the system bus, but may be connected by other interfaces, such as a parallel port, game port, or universal serial bus (USB). A display or other type of display device can also be connected to the system bus via an interface, such as a video adapter which can be part of, or connected to, a graphics processor unit 112. In addition to the display, computers typically include other peripheral output devices, such as speakers and printers (not shown). The exemplary system of FIG. 1 can also include a host adapter, Small Computer System Interface (SCSI) bus, and an external storage device connected to the SCSI bus.

Computer system 100 may operate in a networked environment using logical connections to one or more remote computers, such as a remote computer. The remote computer may be another computer, a server, a router, a network PC, a peer device or other common network node, and typically can include many or all of the elements described above relative to computer system 100.

When used in a LAN or WAN networking environment, computer system 100 can be connected to the LAN or WAN through network interface card 114. The NIC 114, which may be internal or external, can be connected to the system bus. In a networked environment, program modules depicted relative to the computer system 100, or portions thereof, may be stored in the remote memory storage device. It will be appreciated that the network connections described here are exemplary and other means of establishing a communications link between the computers may be used. Moreover, while it is envisioned that numerous embodiments of the present disclosure are particularly well-suited for computerized systems, nothing in this document is intended to limit the disclosure to such embodiments.

Figure 2:
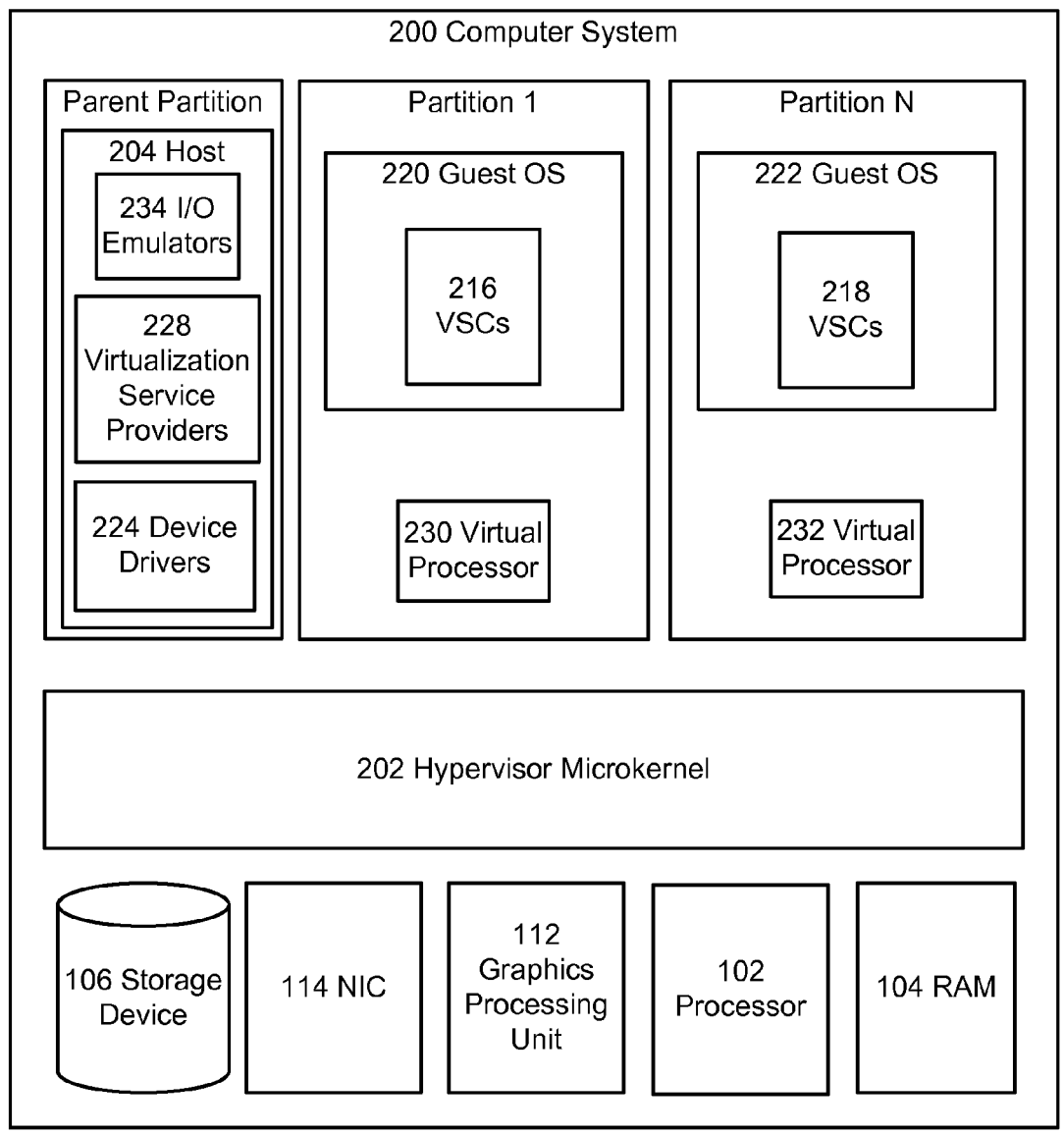
FIG. 2 depicts an operational environment describing an exemplary virtual machine server.

Turning to FIG. 2, illustrated is an exemplary virtual machine server that can be used to generate virtual machines. In this embodiment, hypervisor microkernel 202 can be configured to control and arbitrate access to the hardware of computer system 200. Hypervisor microkernel 202 can isolate processes in one partition from accessing another partition's resources. For example, hypervisor microkernel 202 can generate execution environments called partitions such as child partition 1 through child partition N (where N is an integer greater than 1). In this embodiment, a child partition is the basic unit of isolation supported by hypervisor microkernel 202. Each child partition can be mapped to a set of hardware resources, e.g., memory, devices, logical processor cycles, etc., that is under control of the hypervisor microkernel 202. In embodiments hypervisor microkernel 202 can be a stand-alone software product, a part of an operating system, embedded within firmware of the motherboard, specialized integrated circuits, or a combination thereof.

Hypervisor microkernel 202 can enforce partitioning by restricting a guest operating system's view of the memory in a physical computer system. When hypervisor microkernel 202 instantiates a virtual machine, it can allocate pages, e.g., fixed length blocks of memory with starting and ending addresses, of system physical memory (SPM) to the virtual machine as guest physical memory (GPM). In this embodiment, the guest's restricted view of system memory is controlled by hypervisor microkernel 202. The term guest physical memory is a shorthand way of describing a page of memory from the viewpoint of a virtual machine and the term system physical memory is shorthand way of describing a page of memory from the viewpoint of the physical system. Thus, a page of memory allocated to a virtual machine will have a guest physical address (the address used by the guest operating system) and a system physical address (the actual address of the page).

A guest operating system may virtualize guest physical memory. Virtual memory is a management technique that allows an operating system to over commit memory and to give an application sole access to a contiguous working memory. In a virtualized environment, a guest operating system can use one or more page tables to translate virtual addresses, known as virtual guest addresses into guest physical addresses. In this example, a memory address may have a guest virtual address, a guest physical address, and a system physical address.

In the depicted example, parent partition component, which can also be be also thought of as similar to domain 0 of Xen's open source hypervisor can include a host 204. Host 204 can be an operating system (or a set of configuration utilities) and host 204 can be configured to provide resources to guest operating systems executing in the child partitions 1-N by using virtualization service providers 228 (VSPs). VPSs 228, which are typically referred to as back-end drivers in the open source community, can be used to multiplex the interfaces to the hardware resources by way of virtualization service clients (VSCs) (typically referred to as front-end drivers in the open source community or paravirtualized devices). As shown by the figures, virtualization service clients execute within the context of guest operating systems. However, these drivers are different than the rest of the drivers in the guest in that they may be supplied with a hypervisor, not with a guest. In an exemplary embodiment the path used to by virtualization service providers 228 to communicate with virtualization service clients 216 and 218 can be thought of as the virtualization path.

As shown by the figure, emulators 234, e.g., virtualized IDE devices, virtualized video adaptors, virtualized NICs, etc., can be configured to run within host 204 and are attached to resources available to guest operating systems 220 and 222. For example, when a guest OS touches a memory location mapped to where a register of a device would be or memory mapped to a device, microkernel hypervisor 202 can intercept the request and pass the values the guest attempted to write to an associated emulator. The resources in this example can be thought of as an interface to the virtual device and where the device would be attached to a motherboard. The use of emulators in this way can be considered the emulation path. The emulation path is inefficient compared to the virtualized path because it requires more CPU resources to emulate device than it does to pass messages between VSPs and VSCs. For example, the hundreds of actions on memory mapped to registers required in order to write a value to disk via the emulation path may be reduced to a single message passed from a VSC to a VSP in the virtualization path.

Each child partition can include one or more virtual processors (230 and 232) that guest operating systems (220 and 222) can manage and schedule threads to execute thereon. Generally, the virtual processors are executable instructions and associated state information that provide a representation of a physical processor with a specific architecture. For example, one virtual machine may have a virtual processor having characteristics of an Intel x86 processor, whereas another virtual processor may have the characteristics of a PowerPC processor. The virtual processors in this example can be mapped to logical processors of the computer system such that the instructions that effectuate the virtual processors will be backed by logical processors. Thus, in an embodiment including multiple logical processors, virtual processors can be simultaneously executed by logical processors while, for example, other logical processor execute hypervisor instructions. The combination of virtual processors and memory in a partition can be considered a virtual machine.

Guest operating systems (220 and 222) can be any operating system such as, for example, operating systems from Microsoft®, Apple®, the open source community, etc. The guest operating systems can include user/kernel modes of operation and can have kernels that can include schedulers, memory managers, etc. Generally speaking, kernel mode can include an execution mode in a logical processor that grants access to at least privileged processor instructions. Each guest operating system can have associated file systems that can have applications stored thereon such as terminal servers, e-commerce servers, email servers, etc., and the guest operating systems themselves. The guest operating systems can schedule threads to execute on the virtual processors and instances of such applications can be effectuated.

Figure 3:
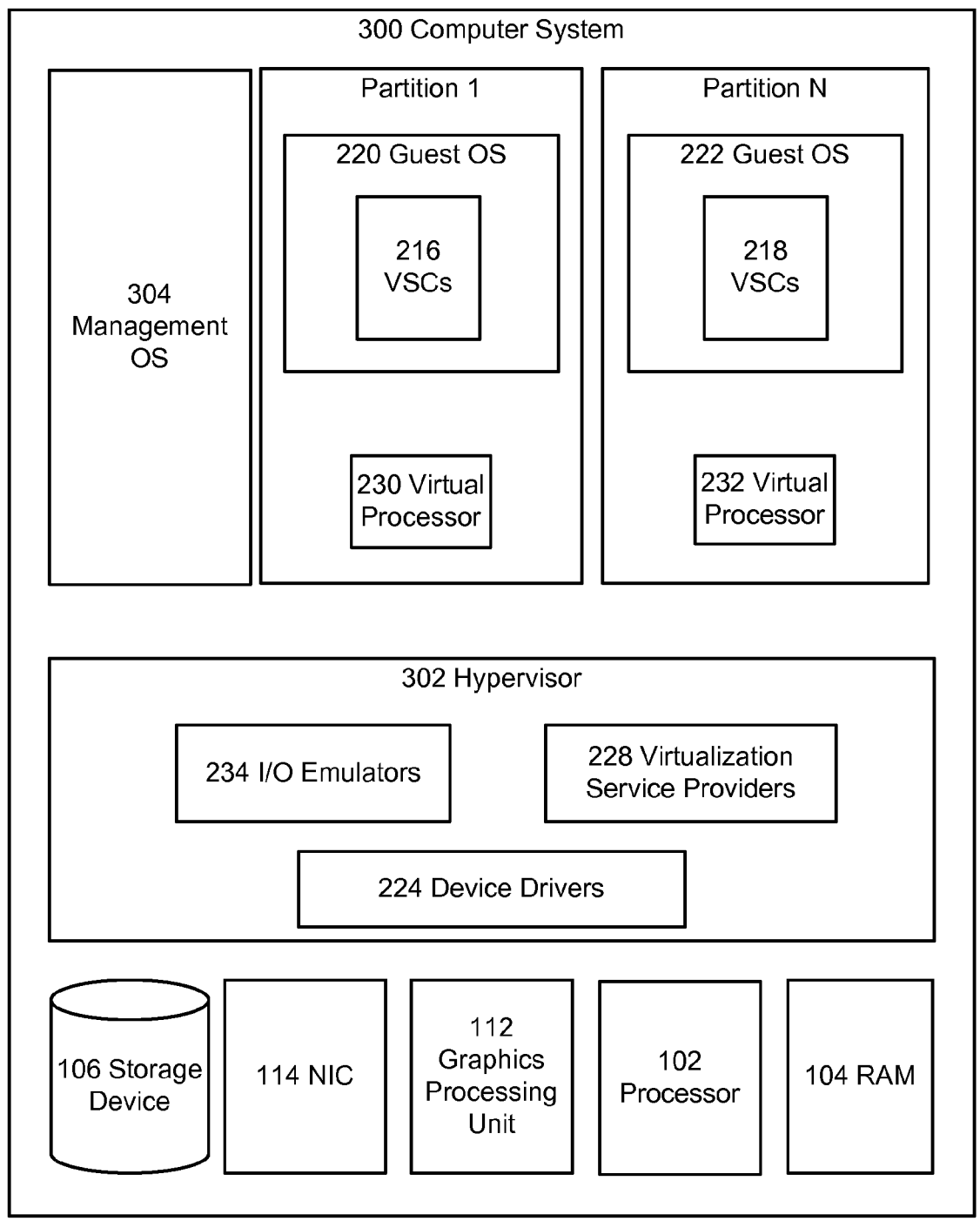
FIG. 3 depicts an operational environment describing an exemplary virtual machine server.

Referring now to FIG. 3, it illustrates an alternative architecture for a virtual machine server. FIG. 3 depicts similar components to those of FIG. 2; however, in this example embodiment hypervisor 302 can include a microkernel component and components similar to those in host 204 of FIG. 2 such as the virtualization service providers 228 and device drivers 224, while management operating system 304 may contain, for example, configuration utilities used to configure hypervisor 302. In this architecture, hypervisor 302 can perform the same or similar functions as hypervisor microkernel 202 of FIG. 2; however, in this architecture hypervisor 304 can be configured to provide resources to guest operating systems executing in the child partitions. Hypervisor 302 of FIG. 3 can be a stand alone software product, a part of an operating system, embedded within firmware of the motherboard or a portion of hypervisor 302 can be effectuated by specialized integrated circuits.

Figure 4:
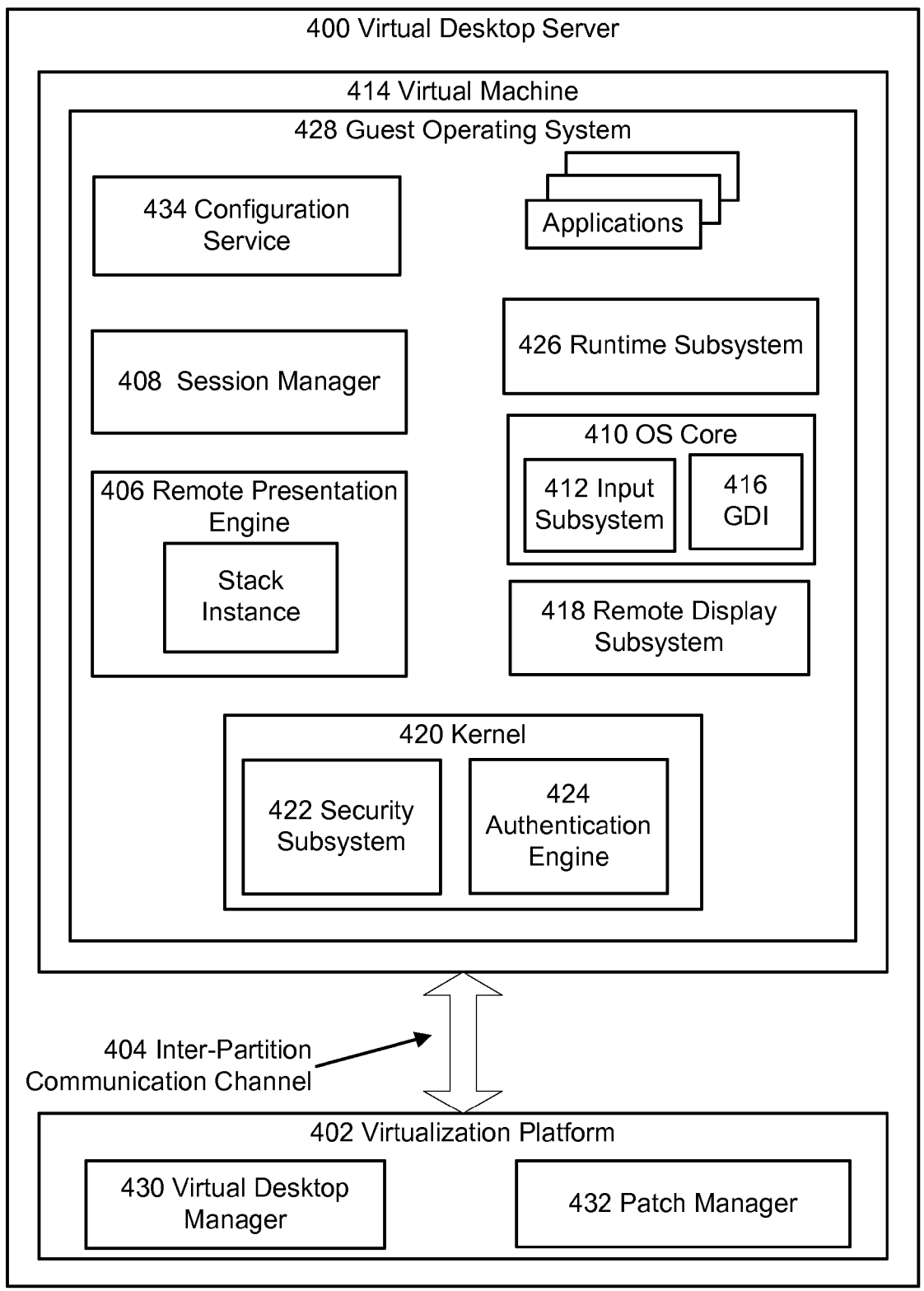
FIG. 4 depicts a high-level block diagram of a virtual desktop server.

Turning now to FIG. 4, it illustrates a high-level block diagram of virtual desktop server 400. In an embodiment, virtual desktop server 400 can be configured to deploy virtual desktop sessions (VDS) to clients, e.g., mobile devices such as smart phones, computer systems having components similar to those illustrated in FIG. 1, etc. Briefly, virtual desktop technology allows a user to remotely interact with a guest operating system running in a virtual machine. Unlike a remote desktop session, in a virtual desktop session only one user is logged into a guest operating system and can have total control of it, e.g., the user can run as an administrator and can have full rights on the guest. In the illustrated example, virtual desktop server 400 can have components similar to computer system 200 or 300 of FIG. 2 or FIG. 3. In the illustrated example, virtualization platform 402 is a logical abstraction of virtualization infrastructure components described above in FIG. 2 and FIG. 3. The functionality described in the following sections as "within" virtualization platform 402 can be implemented in one or more of the elements depicted in FIG. 2 or FIG. 3. For example, virtual desktop manager 430 could be implemented in a host 204 of FIG. 2. More specifically, virtual desktop manager 430 could be implemented in a host operating system running in the parent partition.

Starting a virtual desktop session requires instantiation of a guest operating system within a virtual machine. In an exemplary embodiment, virtual desktop manager 430, e.g., a module of processor executable instructions, can start up virtual machine 414 (along with guest operating system 428) in response to a request. Virtual desktop manager 430 can execute on a logical processor and instruct virtualization platform 402, e.g., microkernel hypervisor 202, to allocate memory for a partition. Virtualization platform 402 can execute and set virtual devices up within virtual machine 414 and load a boot loader program into virtual machine memory. The boot loader program can execute on a virtual processor and load guest operating system 428. For example, session manager 408 can be loaded, which can instantiate environment subsystems such as runtime subsystem 426 that can include a kernel mode part such as operating system core 410. For example, the environment subsystems in an embodiment can be configured to expose a subset of services to application programs and provide an access point to kernel 420. When guest operating system 428 is loaded, the boot loader program can exit and turn control of the virtual machine over to guest operating system 428. Guest operating system 428 can execute the various modules illustrated in FIG. 4 and configure itself to host a virtual desktop session. For example, guest operating system 428 can include registry values that cause remote presentation engine 406 and/or configuration service 434 to start upon boot.

A virtual desktop session can start when guest operating system 428 receives a connection request over a network from a client. A connection request can first be handled by remote presentation engine 406. The remote presentation engine 406 can be configured to listen for connection messages and forward them to session manager 408. As illustrated by FIG. 2, when sessions are generated the remote presentation engine 406 can run a protocol stack instances for the session. Generally, the protocol stack instance can be configured to route user interface output to an associated client and route user input received from the associated client to operating system core 410. Briefly, operating system core 410 can be configured to manage screen output; collect input from keyboards, mice, and other devices.

A user credential, e.g., a username/password combination, can be received by remote presentation engine 406 and passed to session manager 408. Session manager 408 can pass the credential to a logon procedure, which can route the credential to authentication engine 424 for verification. Authentication engine 424 can generate a system token, which can be used whenever a user attempts to execute a process to determine whether the user has the security credentials to run the process or thread. For example, when a process or thread attempts to gain access, e.g., open, close, delete, and/or modify an object, e.g., a file, setting, or an application, the thread or process can be authenticated by security subsystem 422. Security subsystem 422 can check the system token against an access control list associated with the object and determine whether the thread has permission based on a comparison of information in the system token and the access control list. If security subsystem 422 determines that the thread is authorized then the thread can be allowed to access the object.

Continuing with the description of FIG. 4, in an embodiment the operating system core 410 can include a graphics display interface 416 (GDI) and input subsystem 412. Input subsystem 412 in an example embodiment can be configured to receive user input from a client via the protocol stack instance for the virtual desktop session and send the input to operating system core 410. The user input can in some embodiments include signals indicative of absolute and/or relative mouse movement commands, mouse coordinates, mouse clicks, keyboard signals, joystick movement signals, etc. User input, for example, a mouse double-click on an icon, can be received by the operating system core 410 and the input subsystem 412 can be configured to determine that an icon is located at the coordinates associated with the double-click. Input subsystem 412 can then be configured to send a notification to runtime subsystem 426 that can execute a process for the application associated with the icon.

Draw commands can be received from applications and/or a desktop and processed by GDI 416. GDI 416 in general can include a process that can generate graphical object draw commands. GDI 416 in this example embodiment can be configured to pass the commands to remote display subsystem 418 that can instantiate a display driver for the session. In an example embodiment remote display subsystem 418 can be configured to include virtual display driver(s) that can be configured to receive the draw commands and send them to the client.

Also shown in FIG. 4 is a configuration service 434. In an exemplary embodiment, configuration service 434 can be used to setup guest operating system 428 to conduct virtual desktop sessions prior to connection by a client. For example, configuration service 434 can run within guest operating system 428 and be executed when guest operating system 428 boots. Since certain configuration settings require administrative privileges, configuration service 434 can be configured to run as a process with system wide privileges. Some of the exemplary actions configuration service 434 can take include, but are not limited to, actions that add an account identifier for the user to a list of administrative users for guest operating system 428, add the account identifier to a list of authorized virtual desktop users, set registry values, open guest operating system firewalls, and open the port that remote presentation engine 406 listens for connections on. Configuration service 434 is described in more detail in the following paragraphs.

In an exemplary embodiment, a communication channel can be established between virtualization platform 402 and guest operating system 428 in order to configure and control guest operating system 428. Since a remote user can have complete control of virtual machine 414, security needs to be in place to ensure that any channel used to configure and control guest operating system 428 can not also be used to attack virtualization platform 402 or other computer systems connected to an internal network. Traditionally, a networked communication channel is used to setup and control guest operating system 428. Network channels, however are difficult to deploy when guest operating system 428 is not in the same network domain as virtualization platform 402 and virtualization platform 402 is configured to deny incoming connection requests from outside the domain. By using a communication channel that is not network based, clients (virtual desktop sessions) do not have to have any access to the domain as virtualization platform 402, which is where all the "highly secure" data for the service provider is maintained.

In an exemplary embodiment, inter-partition communication channel 404 can be used to communicate with configuration server 434 in order to configure and/or manage the virtual desktop session. Inter-partition communication channel 404 can be configured to be implicitly trusted by virtual machine 414 and not trusted by virtualization platform 402. In this example, information, e.g., data and/or commands, can be easily routed to guest operating system 428 without any need to verify the information. On the other hand, data received from virtual machine 414 can be verified and authenticated before virtualization platform 402 takes an action. Moreover, because inter-partition communication channel 404 does not use networking, guest operating system 428 can be kept off the internal network.

Inter-partition communication channel 404 can be implicitly trusted by virtual machine 414, i.e., information received via the channel is inherently authenticated/validated, because only virtualization platform 402 can create inter-partition communication channel 404. For example, in an embodiment inter-partition communication channel 404 can be implemented at least in part as a region of memory shared between virtual machine 414 and virtualization platform 402. Within the shared memory region, one or more ring buffers can be effectuated and mapped into virtualization platform 402 and virtual machine 414 as a full-duplex communication channel between virtualization platform 402 and virtual machine 414. In an exemplary embodiment, the inter-partition communication channel can include features described in U.S. Pat. No. 7,689,800 entitled "Partition bus," the contents of which are herein incorporated by reference in its entirety.

Virtualization platform 402 can write information to inter-partition communication channel 404 that can be read by virtual machine 414. In an exemplary embodiment, inter-partition communication channel 404 can be message based. That is, virtualization platform 402 and virtual machine 414 can be configured to write packets of data to inter-partition communication channel 404. In the same, or another exemplary embodiment, inter-partition communication channel 404 can be event driven. In this configuration, when information is written to the channel, the receiver can be instructed to read the information from inter-partition communication channel 404 by for example, hypervisor 202 of FIG. 2.

Figure 5:
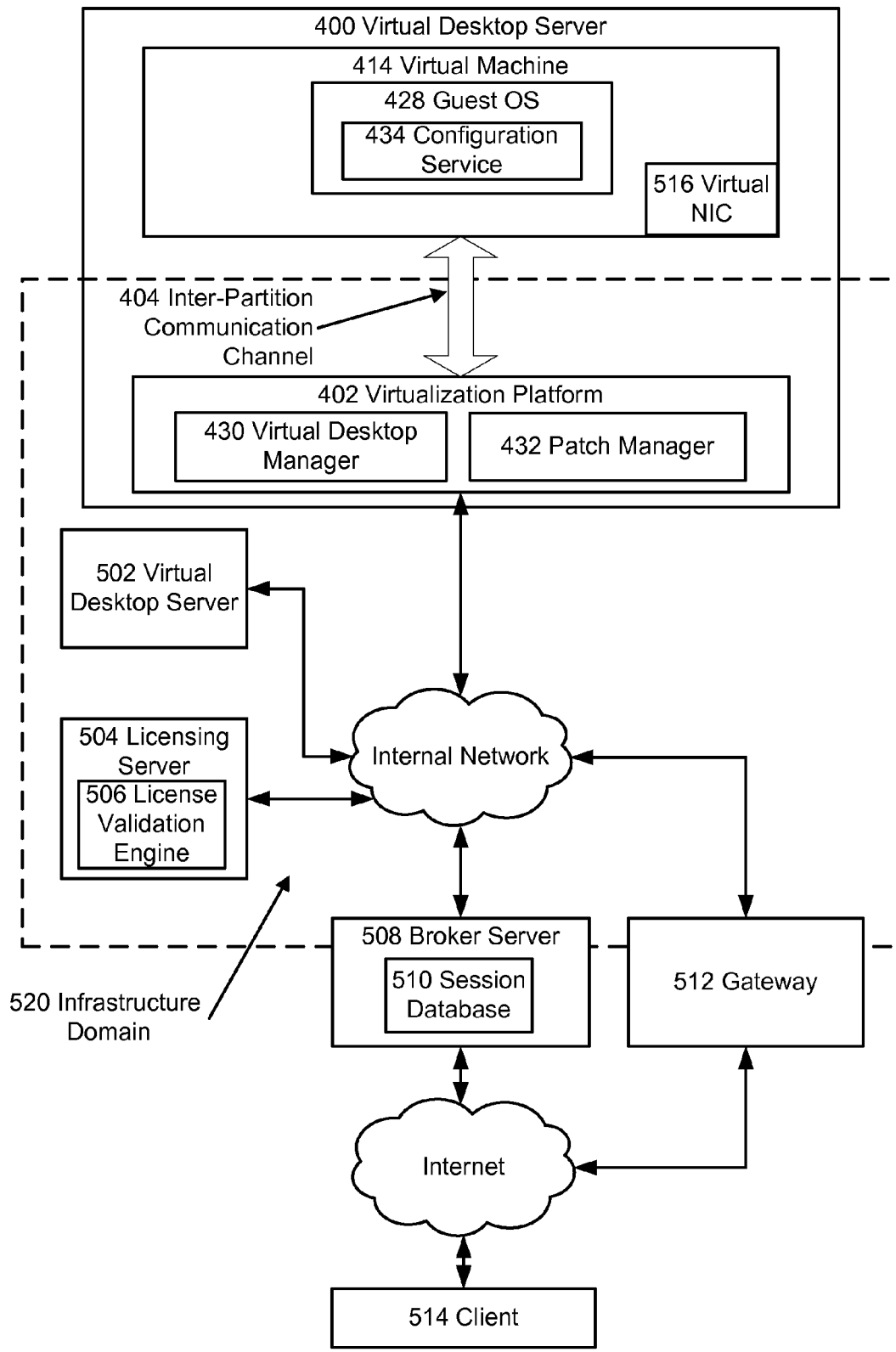
FIG. 5 depicts a high-level block diagram of a datacenter.

Turning now to FIG. 5, it illustrates a high-level block diagram of a datacenter including virtual desktop server 400, virtual desktop server 502, licensing server 504, broker server 508, gateway 512, and client 514. The datacenter can be configured to deploy virtual desktop sessions to clients. In the illustrated example, virtualization platform 402, virtual desktop server 502, licensing server 504, broker server 508, and gateway 512 can be part of an intranet and the user credentials used to log into these computers can be members of the same domain, i.e., the infrastructure domain 520. Infrastructure domain 520 is shown in dashed lines cutting virtual desktop server 400 in half to illustrate that in an exemplary embodiment, virtual machine 414 can be part of a different domain or part of no domain.

The datacenter can include an internal network coupling a plurality of virtual desktop servers (502 and 400), which can include components similar to those illustrated by FIG. 2 or 3, to broker server 508 and licensing server 504. As one of skill in the art can appreciate, while two virtual desktop servers are shown the datacenter can have many more. Also, while virtual desktop server 400 is illustrated running one virtual machine (414), each virtual desktop server can simultaneously host many virtual machines. Or put another way, the datacenter can have M (where M is an integer greater than 1) virtual desktop servers and each of the M virtualization hosts can host N (where N is also an integer greater than 1) virtual machines.

Broker server 508 can act as an interface to the intranet for client 514. Briefly, broker server 508 can include components similar to the components described with respect to FIG. 1. Broker server 508 can have a network adapter that interfaces it to a public network, such as the Internet, and another network adapter that interfaces it to the internal network, i.e., the intranet. In this example, broker server 508 can act as a gateway for the internal network, thereby allowing virtual desktop servers and licensing server 504 to be kept off the public network.

When user of client 514 wants a virtual desktop session, he or she can click on an icon and client 514 can send one or more packets of information to broker server 508. Broker server 508 can include a module of software instructions that upon execution cause a logical processor to select a suitable virtualization host to instantiate a virtual machine to host the virtual desktop session. A user credential, e.g., a username and password combination, can be collected and broker server 508 can check session database 510 to determine whether the datacenter includes any disconnected virtual desktop sessions associated with the user credential such as a username/password combination. If session database 510 includes a disconnected virtual desktop session associated with the user credential, broker server 508 can send a signal to the virtualization host that has the disconnected session and instruct it to execute the virtual machine. If session database 510 does not have information indicative of a disconnected session for the user, broker server 508 can select a suitable virtual desktop server, e.g., one that has the resources available to instantiate a virtual machine to host a virtual desktop session.

Virtualization platform 402 can instantiate virtual machine 414 and execute guest operating system 428 on a virtual processor. Referring back to FIG. 4, guest operating system 428 can run remote presentation engine 406; return an internet protocol (IP) address of virtual NIC 516 to broker server 508; and await a connection from client 514. Broker server 508 can return the IP address of virtual NIC 516 to client 514 in a packet of information that causes a logical processor of client 514 to redirect client to the IP address virtual machine 414. Gateway 512 can receive the connection request and forward it to virtual NIC 516.

In an least one exemplary embodiment, session manager 408 can be configured to check to see if the client 514 is associated with a valid license before starting the virtual desktop session. Remote presentation engine 406 can receive a license from client 514 (or information associated with a license) and send the information to virtualization platform 402, which can send the license (or the information associated with the license) to licensing server 504. Licensing server 504 can include license validation engine 506, which can be configured to determine whether a license associated with client 514 is valid. If the license is valid, license validation engine 506 can send a signal back virtual desktop server 400 and a virtual desktop session can be started. At this point, remote presentation engine 406 can stream one or more packets of information indicative of a graphical user interface for guest operating system 428 to client 514 and receive one or more packets of information indicative of user input from client 514.

In an exemplary embodiment, when virtualization platform 402 receives a request from broker server 508 to instantiate a virtual machine, virtual desktop manager 430 can execute and send commands and/or information via inter-partition communication channel 404 to virtual machine 414 to cause guest operating system 428 to be configured to conduct a virtual desktop session. Configuration service 434 can receive the commands and/or information and configure guest operating system 428 accordingly. For example, virtual desktop manager 430 can send the identity of the user attempting to connect, desired settings for a firewall protecting guest operating system 428, registry values, a list of applications the user is allowed to operate, commands to enable virtual desktop sessions and to add the identity of the user to a list of authorized virtual desktop users, etc. Configuration service 434 can execute on a virtual processor and change appropriate settings.

Once the virtual desktop session is running, virtual desktop manager 430 can manage a running virtual desktop session via inter-partition communication channel 404. For example, virtual desktop manager 430 can issue commands to virtual machine 414 such as commands that cause the guest operating system 428 to shut down, disconnect the user, reset the guest operating system 428, etc. In the same, or another embodiment, virtual desktop manager 430 can manage the virtual desktop session receive state information for virtual machine 414, status information from remote presentation engine 406, and/or send commands to control the virtual desktop session to configuration service 434. For example, virtual desktop manager 430 can receive state information for virtual machine 414 that indicates whether virtual machine 414 is running, paused, ready, booting, as well as a list of IP addresses that can be sent to the client. In addition, virtual desktop manager 430 can receive status information for guest operating system 428 such as the identity of the user that is logged in for the virtual desktop session, and communicate some or all of this information to broker server 508.

Figure 6:
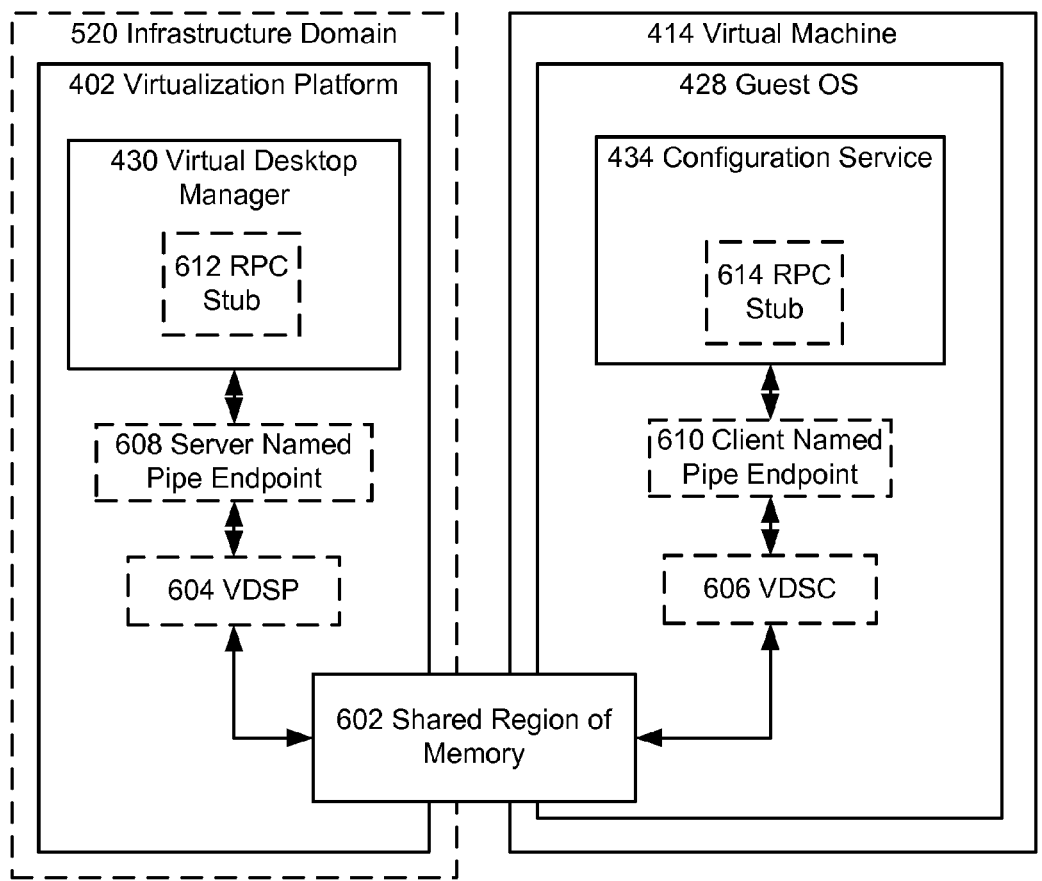
FIG. 6 depicts a high-level block diagram of a virtual desktop server.

Referring now to FIG. 6, it illustrates a high-level diagram of an exemplary inter-partition communication channel 404 configuration. In the illustrated embodiment, inter-partition communication channel 404 can be implemented using shared region of memory 602, which can include a communication channel effectuated by a ring buffer that is mapped to both virtual machine 414 and virtualization platform 402. As shown by the figure, in an exemplary embodiment virtual desktop service provider 604 and virtual desktop service client 606 can be configured to send/receive messages passed via region of shared memory 602. Virtual desktop service provider 604 and virtual desktop service client 606 are illustrated in dashed lines to indicate that they are considered optional and in an embodiment their functionality can be subsumed by virtual desktop manager 430 and configuration service 434. Server named pipe endpoint 608 and client named pipe endpoint 610 are also illustrated in dashed lines. These dashed lines are used to indicate that these elements are also considered optional. In an exemplary embodiment server named pipe endpoint 608 and client named pipe endpoint 610 can be attached to virtual desktop service provider 604 and virtual desktop service client 606 and/or could be connected directly to virtual desktop manager 430 and configuration service 434 and shared region of memory 602. Also, RPC stubs 612 and 614 are illustrated in dashed lines to indicate that they are considered optional. In this exemplary embodiment, virtual desktop manager 430 and configuration service 434 can be configured to issue remote procedure calls (RPC) to virtual desktop service provider 604 and virtual desktop service client 606. Shared region of memory 602 can be one or more pages of random access memory that can be allocated from, for example, the pool of memory allocated to virtual machine 414.

In an exemplary embodiment, virtual desktop manager 430 can be configured to communicate with configuration service 434 using virtual desktop service provider 604 and virtual desktop service client 608. In this exemplary embodiment, virtual desktop manager 430 can be configured to communicate with virtual desktop service provider 604 instead of directly with shared region of memory 602. In this illustrated embodiment, virtual desktop service provider 604, e.g., a kernel mode module of executable instructions, can create the region of shared memory 602 between virtualization platform 402 and virtual machine 414. Generally, virtual desktop service provider 604 is configured to add and remove packets to inter-partition communication channel 404 that contain configuration information, i.e., data and/or commands.

In an exemplary embodiment, virtual desktop service provider 604 can cause guest operating system 428 to load virtual desktop service client 606, which can create shared region of memory 602. For example, virtual desktop service provider 604 can be configured to inject, i.e., load a device identifier into a region of memory reserved for input/output drivers to attach to a motherboard. When guest operating system 428 boots, a plug-and-play manager running in guest operating system 428 can detect the device identifier and search a driver repository and find virtualization service provider 606. Virtualization service provider 606 can load and setup shared region of memory 602. Virtual desktop service client 606 can write a packet to shared region of memory 602. Virtual desktop service provider 604 can detect the packet and the channel can be opened. Virtual desktop service client 606 is another kernel code module of executable instructions that can expose an interface to configuration service 434 that can be used to pass messages received from virtual desktop service provider 604. Configuration service 434 can receive configuration information for the virtual desktop session and can configure guest operating system 428 in order to conduct a virtual desktop session with client 514.

In another exemplary embodiment, virtualization platform 402 and virtual machine 414 can optionally implement named pipe interfaces (608 and 610) that operate with virtual desktop service provider 604 and virtual desktop service client 606. In this exemplary embodiment inter-partition communication channel 404 can appear like a named pipe. This configuration is useful to allow third party developers to reuse existing code that can attach to named pipe endpoints. A named pipe is a concept used for communicating between two processes. In this exemplary embodiment, instead of communicating between processes, named pipe endpoints (608 and 610) can be configured to issue messages to inter-partition communication channel 404.

In yet another exemplary embodiment, virtual desktop manager 430 and configuration service 434 can include remote procedure call subs (612 and 614). In this exemplary embodiment, virtual desktop manager 430 can invoke RPC stub 612 to issue function invocations to configuration service 434. In this exemplary embodiment, the RPC stubs (612 and 614) can be configured to issue function invocations to virtual desktop service provider 604 and virtual desktop service client 606. Inter-partition communication channel 404 can be used to tunnel the RPC calls from virtualization platform 402 to guest operating system 428.

The following are a series of flowcharts depicting operational procedures. For ease of understanding, the flowcharts are organized such that the initial flowcharts present implementations via an overall "big picture" viewpoint and subsequent flowcharts provide further additions and/or details that are illustrated in dashed lines. Furthermore, one of skill in the art can appreciate that the operational procedure depicted by dashed lines are considered optional.

Figure 7:
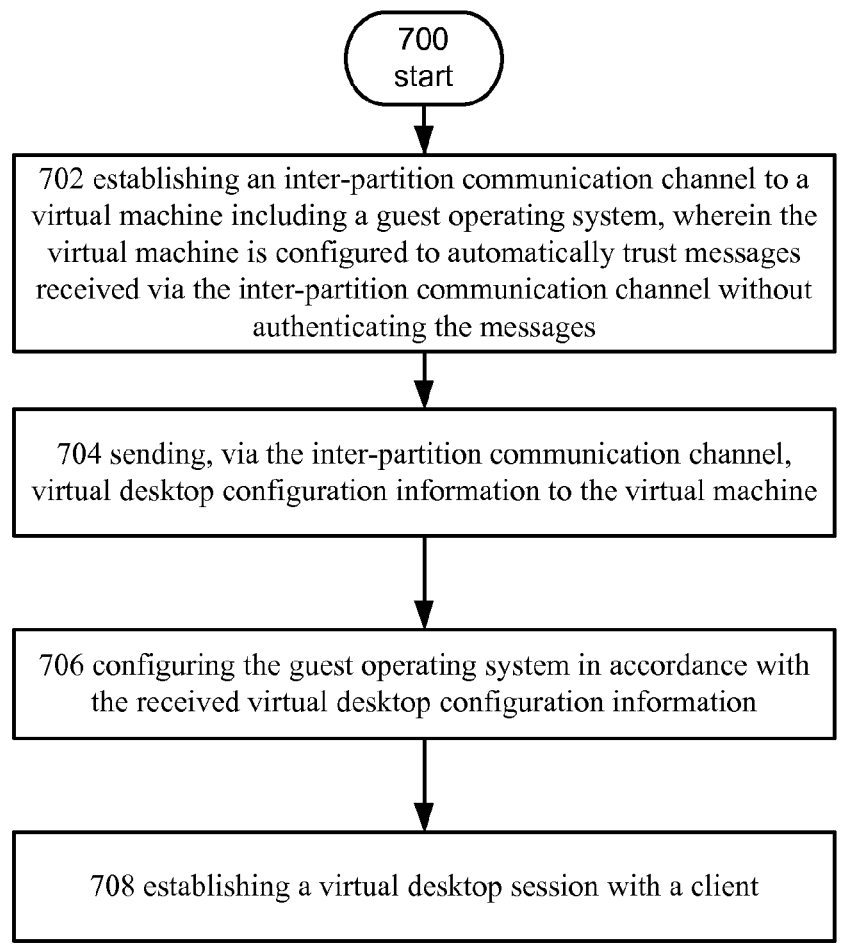
FIG. 7 depicts an operational procedure.

FIG. 7 illustrates an operational procedure for configuring a virtual desktop session including the operations 700, 702, 704, 706, and 708. Operation 700 begins the operational procedure, and operation 702 shows establishing an inter-partition communication channel to a virtual machine including a guest operating system, wherein the virtual machine is configured to automatically trust messages received via the inter-partition communication channel without authenticating the messages. For example, and turning to FIG. 5, in an exemplary embodiment virtualization platform 402 can establish inter-partition communication channel 404 to virtual machine 414. For example, virtualization platform 402 can cause virtual machine 414 to open inter-partition communication channel 404. In response to the request, virtual machine 414 can allocate one or more pages of guest memory for the channel and accept the connection request. Virtualization platform 402 and/or virtual machine 414 can then write data to the shared memory.

In this example embodiment, virtual machine 414 can be configured to implicitly trust messages that are received via inter-partition communication channel 404 due to how the channel is established. For example, and referring to FIG. 6, in an exemplary embodiment virtualization host 402 can cause the inter-partition communication channel 404 by affecting what devices attach to a virtual motherboard. Since virtualization platform 402 is the only entity that can cause such a channel to open, virtual machine 414 can implicitly trust that any information, e.g., data and/or commands that are received via the channel was sent by the module that controls it.

In this exemplary configuration, since virtualization platform 402 is the only entity that can inject device identifiers into the address space allocate to IO device, the resulting channel that is established by the above process can be implicitly trusted by, for example, configuration service 434. In this regard, configuration service 434 can implicitly trust that any message it receives via inter-partition communication channel 404 was in fact sent by virtual desktop manager 430 without having to go through an authorization and authentication process that would normally be used in a networking configuration.

Turning to operation 704, it shows sending, via the inter-partition communication channel, virtual desktop configuration information to the virtual machine. For example, and again turning to FIG. 5, inter-partition communication channel 404 can be used to transport configuration information for setting up a virtual desktop session from virtualization platform 402 to virtual machine 414. In a specific example, virtual desktop manager 430 can generate configuration information in response to receiving a connection request from broker server 508. For example, broker server 508 could receive a connection request from client 514 and obtain a username/password combination. Broker server 508 could send the username/password combination to virtual desktop manager 430, which can run and generate one or more packets of configuration information that can cause configuration service 434 to configure guest operating system 428 in order to conduct a virtual desktop session with client 514.

Continuing with the description of FIG. 7, operation 706 shows configuring the guest operating system in accordance with the received virtual desktop configuration information. For example, and turning back to FIG. 5, virtual machine 414 can receive the configuration information for setting up guest operating system 428 to conduct virtual desktop sessions and use the information to configure guest operating system 428. For example, configuration service 434 executing within guest operating system 428 can receive configuration information via inter-partition communication channel 404 and use it to setup guest operating system 428 so that it can receive an incoming connection request from client 514.

Turning now to operation 708 of FIG. 7, it illustrates establishing a virtual desktop session with a client. Turning back to FIG. 5, remote presentation engine 406 can monitor a port on virtual NIC 516 for a connection request from client 514. In response to receiving a request, remote presentation engine 406 can start a virtual desktop session with client 514 and start streaming packets of data indicative of a graphical user interface of guest operating system 428 to client 514.

Figure 8:
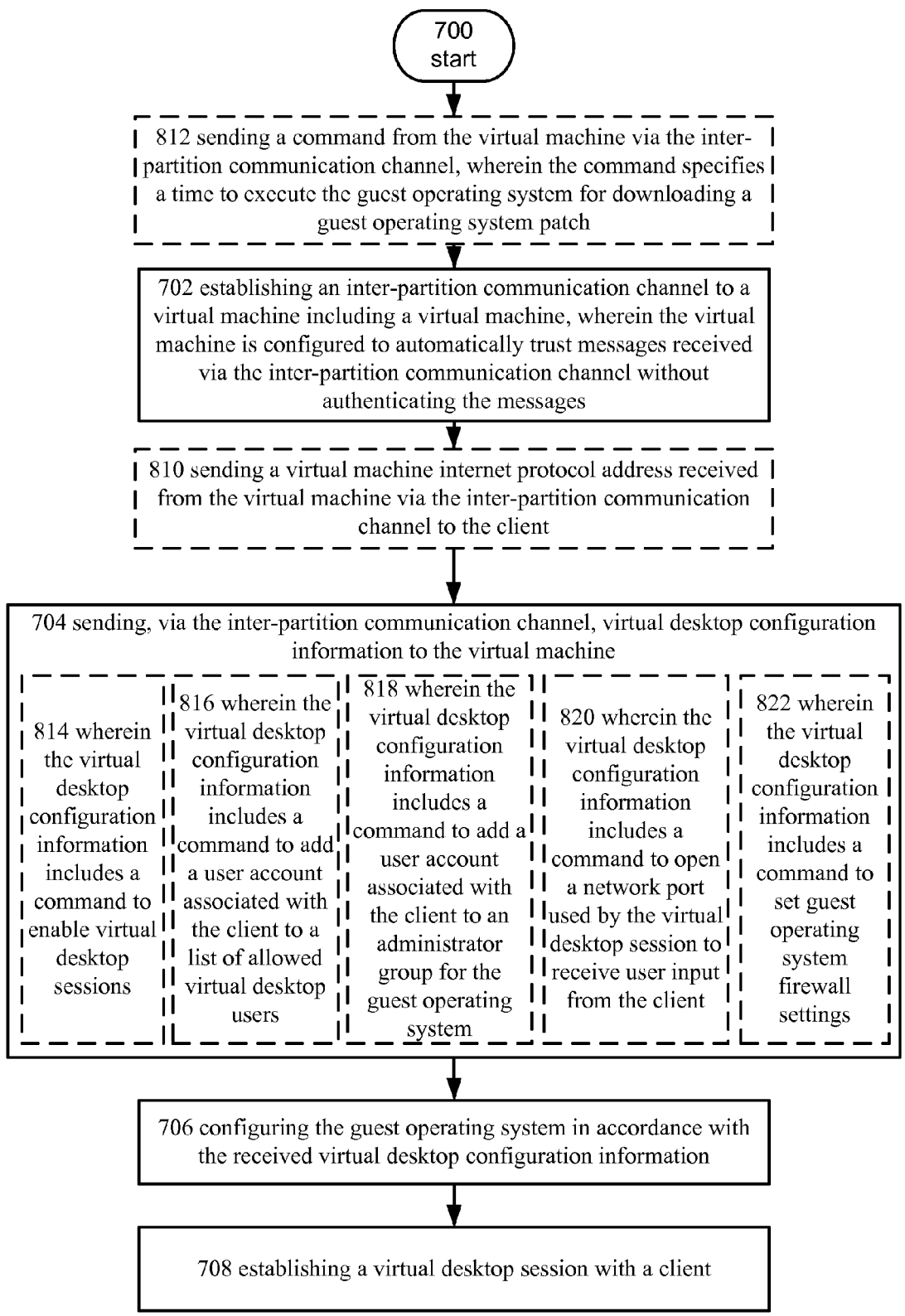
FIG. 8 depicts an alternative embodiment of the operational procedure of FIG. 7.

Referring now to FIG. 8, it illustrates an alternative operational procedure to the operational procedure depicted in FIG. 7. The alternative operational procedure includes the additional operations 810 and 812 along with refinements 814-822. As shown by the figure, operation 810 shows sending a virtual machine internet protocol address received from the virtual machine via the inter-partition communication channel to the client. For example, and referring back to FIG. 5 in an exemplary embodiment, the IP address of virtual NIC 516 can be communicated by configuration service 434 to virtual desktop manager 430 via inter-partition communication channel 404. In this exemplary embodiment, the IP address of virtual machine 414 can be obtained by configuration service 434 by querying virtual NIC 516. Configuration service 434 can then send the IP address to virtual desktop manager 430 via inter-partition communication channel 404. In a specific example embodiment, configuration service 434 can receive the IP address and pass it to virtual desktop service client 606 of FIG. 6, which can write the IP address to shared memory. Virtual desktop service provider 604 can receive a signal that a message was written to shared memory, i.e., inter-partition communication channel 404 can be event based; access the shared memory; and read the IP address. Virtual desktop service provider 604 can then pass the IP address to virtual desktop manager 430. Virtual desktop manager 430 can execute and send the IP address to broker server 508 of FIG. 4, which can route the IP address to client 514. Client 514 can then attempt to connect to the IP address to conduct a virtual desktop session.

Continuing with the description of FIG. 8, operation 812 shows sending a command from the virtual machine via the inter-partition communication channel, wherein the command specifies a time to execute the guest operating system for downloading a guest operating system patch. In an exemplary embodiment, and referring to FIG. 5, patch manager 432 of FIG. 4, e.g., a module of executable instructions, is configured to schedule times to instantiate virtual machine 414 in order for it to download operating system patches for guest operating system 428. In this exemplary embodiment, patch manager 432 can be configured to receive a signal from guest operating system 428 indicating the time it is scheduled to fetch patches via inter-partition communication channel 404 and save the time in memory. Patch manager 432 can detect the time and compare it to the current time. In the instance that the current time is the same as the detected time, patch manager 432 can be configured to send a signal to virtual desktop manager 430 to instantiate virtual machine 414 and run guest operating system 428. Guest operating system 428 can initiate an update procedure and download one or more patches via virtual NIC 516.

Turning to refinement 814, it illustrates that in an exemplary embodiment, the virtual desktop configuration information includes a command to enable virtual desktop sessions. For example, and referring back to FIG. 5, in exemplary embodiments guest operating system 428 may need to be configured to allow remote connections. For example, guest operating system 428 may need to have certain registry keys set in order to allow remote connections. In this example, when configuration service 434 receives a command to enable remote connections, configuration service 434 can open the registry of guest operating system 428; locate a registry key that is associated with allowing remote connections; and set a registry value for the key that allows remote computers to connect.

Turning now to refinement 816, it shows that in an embodiment the virtual desktop configuration information includes a command to add a user account associated with the client to a list of allowed virtual desktop users. For example, and referring back to FIG. 5, in exemplary embodiments guest operating system 428 may need to be configured to allow remote connections for the user account logging in. In this example, configuration service 434 can be configured to enable remote connections for the specific user that will be logging on. This adds another level of security because guest operating system 428 does not have to be pre-deployed with a list of users that can connect and rely on an administrator to keep the list updated. In this example, virtual desktop manager 430 can receive the username associated with client 514 from broker server 508 of FIG. 5 and write it to inter-partition communication channel 404. Configuration service 434 can execute on a virtual processor and receive the username and a request to add the username to a list of allowed virtual desktop users. Configuration service 434 can execute on the virtual processor and configure guest operating system 428 to add the username to the list of remote users that are allowed to remotely connect to guest operating system 428.

Refinement 818 of FIG. 8 illustrates that in an embodiment the virtual desktop configuration information includes a command to add a user account associated with the client to an administrator group for the guest operating system. For example, in an embodiment virtual desktop manager 430 can receive one or more packets of information from broker server 508 of FIG. 5. In this example, broker server 508 can be communicating a request to instantiate a virtual desktop session and the request can include a username. In this example, virtual desktop manager 430 can be configured to add the username to the list of administrators for guest operating system 428. For example, an administrator could have setup a user account that has administrator privileges in a directory and associated it with a username. Broker server 508 could receive the username and look up the user account in the directory; determine that the user has administrator privileges; and communicate this information to virtual desktop manager 430.

Virtual desktop manager 430 can cause virtual machine 414 to be instantiated and inter-partition communication channel 404 to be established. Virtual desktop manager 430 can send a signal to configuration service 434 (via inter-partition communication channel 404) to add the username to an administrator group for guest operating system 428. Configuration service 434 can then change registry settings associated with a list of usernames to include the username associated with client 514.

Continuing with the description of FIG. 8, refinement 820 illustrates that in an embodiment the virtual desktop configuration information includes a command to open a network port used by the virtual desktop session to receive user input from the client. For example, in an embodiment configuration service 434 can receive a command to open up a port so that client 514 can connect to virtual machine 414. Configuration service 434 can receive the command and execute on a virtual processor. Configuration service 434 can modify a network software stack to open up a port that is used by remote presentation engine 406 to accept incoming connections. For example, remote presentation engine 406 can be configured to register with guest operating system 428 to use a specific port. If the port is closed, guest operating system 428 will discard any data received that is associated with the port number and remote presentation engine 406 will not receive it. For example, the port could be a transmission control protocol port, which is a software construct that serves as a communications endpoint for remote presentation engine 406.

Turning now to refinement 822, it shows that in an embodiment the virtual desktop configuration information includes a command to set guest operating system firewall settings. For example, and referring back to FIG. 5, in exemplary embodiments guest operating system 428 may need to have a firewall properly configured in order to allow virtual desktop connections. For example, guest operating system 428 may run a software firewall that blocks incoming connections. In this example embodiment, the configuration information can include a command to direct configuration service 434 to add an exception for virtual desktops to the firewall. For example, configuration service 434 can receive the command via inter-partition communication channel 404 and can configure a guest operating system's firewall to allow incoming virtual desktop connections.

Figure 9:
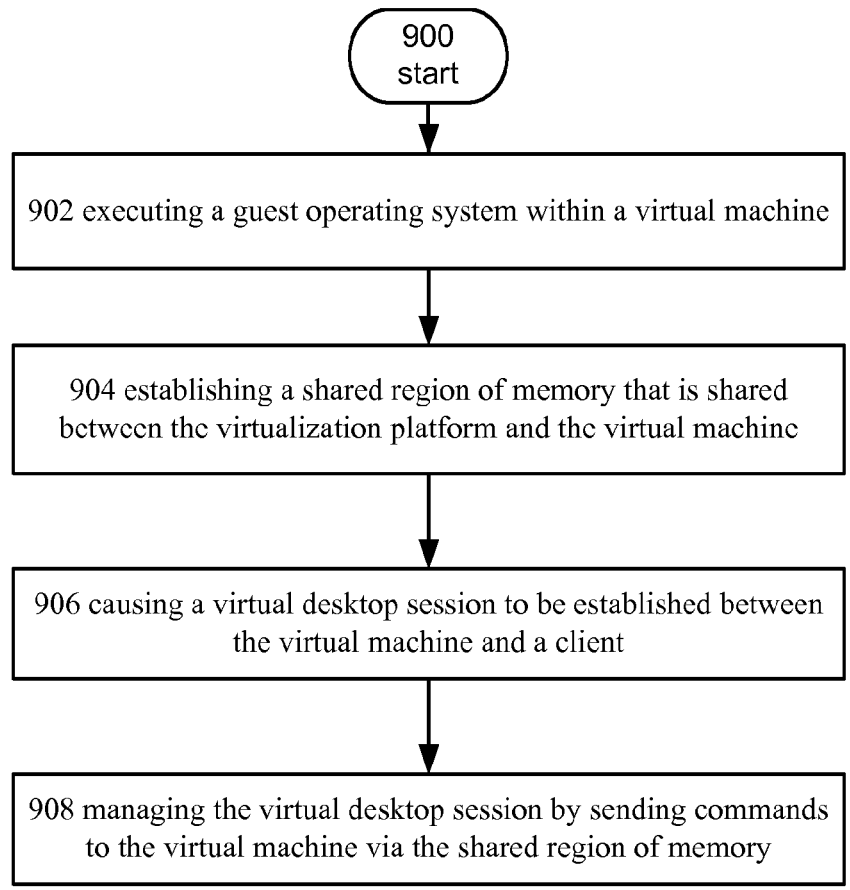
FIG. 9 depicts an operational procedure.

Referring now to FIG. 9, it illustrates an operational procedure for deploying a virtual desktop. The operational procedure begins with operation 900 and operation 902 shows executing a guest operating system within a virtual machine. For example, and turning to FIG. 5, virtualization platform 402 can instantiate and control virtual machine 414. Within virtual machine 414, guest operating system 428 can be booted on a virtual processor, which can be scheduled as a thread on a logical processor. A hypervisor scheduler, e.g., a component of virtualization platform 402, can execute and schedule the thread indicative of the virtual processor to run on a logical processor. Guest operating system 428 can then execute on the logical processor.

Turning to operation 904, it illustrates the operation establishing a shared region of memory that is shared between a virtualization platform and the virtual machine. For example, and turning again to FIG. 6, inter-partition communication channel 404 can be implemented at least in part as shared region of memory 602 shared between virtualization platform 402 and virtual machine 414. In an exemplary embodiment, one or more processes executing within virtual machine 414 and one or more processes executing within virtualization platform 402 can asynchronously access, independently access, and/or simultaneously access shared region of memory 602.

In an exemplary embodiment, inter-partition communication channel 404 can be established from at least shared region of memory 602 by using virtual desktop service provider 604 and virtual desktop service client 606. In this example, virtual desktop service provider 604 can execute and cause virtual desktop service client 606 to load and configure shared region of memory 602 so that virtual desktop service provider 604 can access it. Virtual desktop service client 606 can execute on a virtual processor and write a control packet to the region of memory, which can be detected by virtual desktop service provider 604. Similar to the previously described embodiments, in this exemplary configuration, since virtualization platform 402 is the only entity that can inject device identifiers into the address space allocated for IO devices in virtual machine 414, the resulting channel that is established can be implicitly trusted by, for example, configuration service 434. In this regard, configuration service 434 can automatically authenticate messages received via inter-partition communication channel 404 without having to go through an authorization and authentication process that would normally be used in a networking configuration.

Continuing with the description of FIG. 9, operation 906 shows causing a virtual desktop session to be established between the virtual machine and a client. Turning to FIG. 5, remote presentation engine 406 can monitor a port for a connection request from client 514. In response to receiving a request, remote presentation engine 406 can start a virtual desktop session with client 514 similar to that described above and start streaming packets of data indicative of a graphical user interface of guest operating system 428 to client 514.

Continuing with the description of FIG. 9, operation 908 shows managing the virtual desktop session by sending commands to the virtual machine via the shared region of memory. For example, virtual desktop manager 430 can receive requests from an administrator and send commands to configuration service 434 shared region of memory 602. In an exemplary embodiment, the commands can include, but are not limited to, commands for shutting down guest operating system 428, disconnecting the user, resetting guest operating system 428, etc. In addition to sending commands, virtual desktop manager 430 can obtain data from virtual machine 414 indicating its status, the identity of the logged in user, etc.

Figure 10:
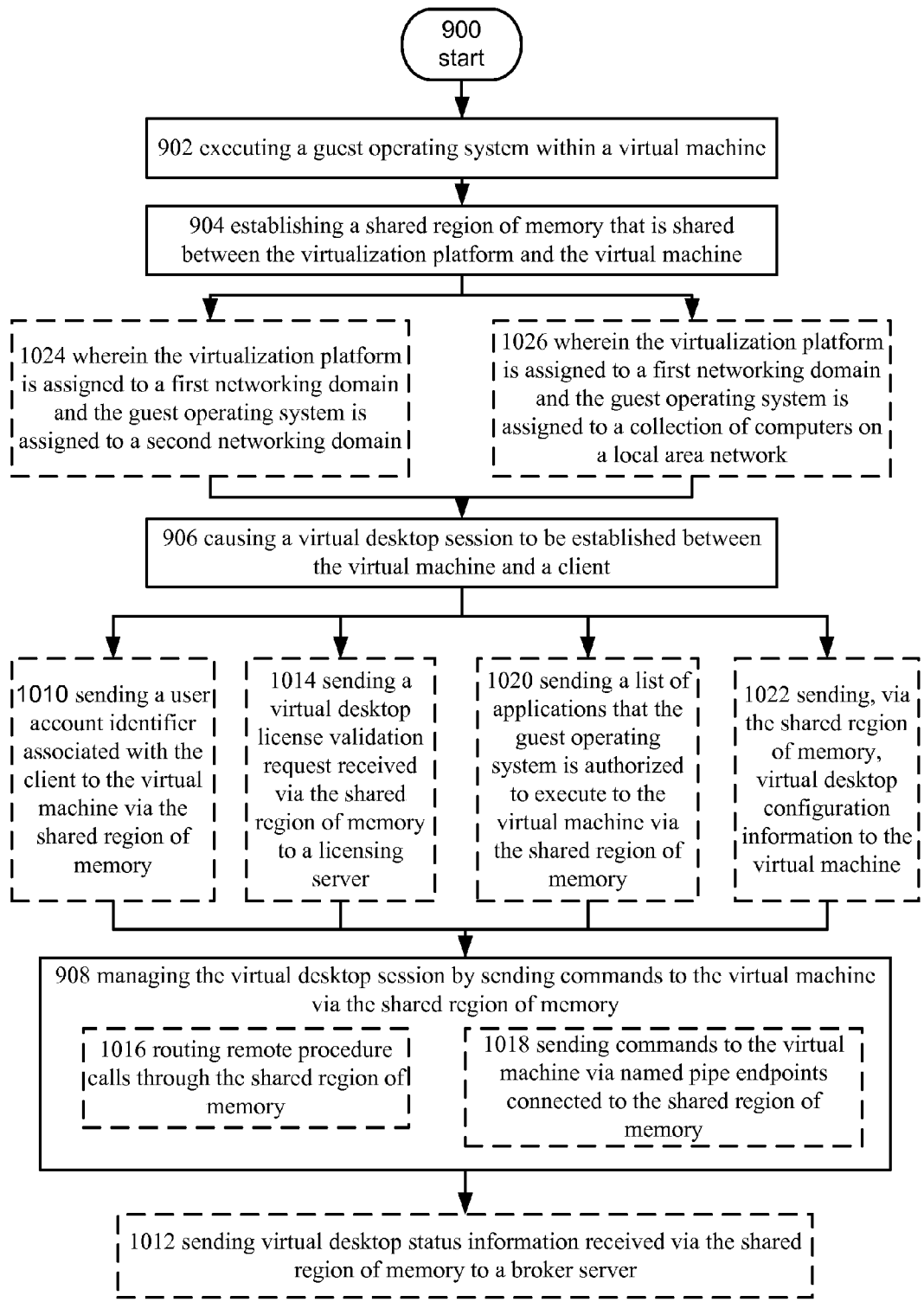
FIG. 10 depicts an alternative embodiment of the operational procedure of FIG. 9.

FIG. 10 shows an alternative embodiment of the operational procedure depicted in FIG. 9 including the additional operations/refinements 1010-1026. Operation 1010 begins the operational procedure and the operation shows sending a user account identifier associated with the client to the virtual machine via the shared region of memory. For example, and referring to FIG. 5, virtualization platform 402, e.g., virtual desktop manager 430, e.g., one or more modules of executable instructions, can run on a logical processor and receive a user account identifier from client 514. In this example, the user account identifier can be associated with a virtual desktop connection request received from client 514. Because virtual desktop server 400 can be connected to intranet and part of infrastructure domain 520, the client request could have first been authorized and validated by broker server 508 and then routed to virtual desktop manager 430.

Similar to the exemplary embodiments described above, a user account identifier, e.g., a username, could be sent via shared region of memory 602 along with a command to add the user account identifier to a list of administrative users on guest operating system 428, a command to add the user account identifier to a list of virtual desktop enabled users, and/or a list of allowed applications for associated with the username. In this example, configuration service 434 can receive the user account identifier and any associated commands and configure guest operating system 428 accordingly.

Referring again to FIG. 10, operation 1012 shows sending virtual desktop status information received via the shared region of memory to a broker server. For example, and turning to FIG. 5, in an exemplary embodiment, virtualization platform 402 can include executable instructions, e.g., virtual desktop manager 430, that can execute on a logical processor and cause status information for the virtual desktop session to be sent to broker server 508. For example, status information for the virtual desktop session can include information that describes whether the session is active or in a disconnected state, a username associated with a user that is logged into guest operating system 428 and/or the length of time the user has been logged into guest operating system 428, etc. In this exemplary embodiment, the virtual desktop status information can be received by virtual desktop manager 430 from shared region of memory 602. Broker server 508 can receive the data and update session database 510. In an exemplary embodiment, an administrator could query the session database 510 to receive this information.

Operation 1014 shows sending a virtual desktop license validation request received via the shared region of memory to a licensing server. Turning back to FIG. 5, in an exemplary embodiment, a license can be presented to session manager 408 when client 514 connects to guest operating system 428. In this exemplary embodiment, session manager 408 can write the license to shared region of memory 602. Virtual desktop manager 430 can receive the license and send the license to licensing server 504 for validation. In this exemplary embodiment, guest operating system 428 would not have to have a network connection to licensing server 504 in order to validate licenses.

Operation 1016 shows routing remote procedure calls through the shared region of memory. For example, and turning to FIG. 6, in an exemplary embodiment, virtual desktop manager 430 can be configured to issue remote procedure calls to configuration service 434 to cause configuration service 434 to configure guest operating system 428 to conduct a virtual desktop session. However, instead of establishing a TCP/IP connection with virtual machine 414 to effectuate the remote procedure call, the connection can be tunneled through shared region of memory 602. In this exemplary embodiment, remote procedure call stub 612 can be accessed by virtual desktop manager 430 and virtual desktop manager 430 can issue a remote procedure call to manage, e.g., control and/or obtain data from configuration service 434. Instead of issuing packets indicative of the function invocation via a network connection, RPC stub 612 can be configured to interface with virtual desktop service provider 604, which can receive the function invocation and send a message to virtual desktop service client 606 via the shared region of memory. Virtual desktop service client 606 can route the remote procedure function invocation RPC stub 614, which can process the function invocation as if it had been received over a network connection.

Turning to operation 1018, it shows sending commands to the virtual machine via named pipe endpoints connected to the shared region of memory. For example, and turning to FIG. 6, in an exemplary embodiment, shared region of memory 602 can be connected to named pipe endpoints 608 and 610, which can connect to virtual desktop manager 430, patch manager 432, or any other third party code that is configured to connect to named pipes. In this exemplary embodiment, the named pipe endpoints can be configured to interface directly with shared region of memory and/or virtual desktop service provider/client (604 and 606). Generally, a named pipe can be a duplexed construct used for inter-process communication. Multiple instances of the same named pipe can be instantiated and each instance can include a set of endpoints and have its own buffers and handles to provide a conduit for communication. When a process writes a message to a named pipe input buffer, the named pipe endpoint sends the message to the output buffer and notifies another client that a message has arrived.

Turning to operation 1020, it shows sending a list of applications that the guest operating system is authorized to execute to the virtual machine via the shared region of memory. For example, a list of applications that the user can run during the virtual desktop session can be communicated to configuration service 434 via shared region of memory 602. Configuration service 434 can modify a list of allowed applications for this user and configure guest operating system 428 so that guest operating system 428 can only run the applications on the list during a virtual desktop session associated with the user account. For example, configuration service 434 can configure a user account on guest operating system 428 by adding the list of allowed applications to it. When the user logs on to guest operating system 428, an access token can be created that encapsulates the user's privileges. The access token can be checked when a user attempts to open an application and the token can be checked against an access control list. If the user account is not listed in the access control list, security subsystem 422 of guest operating system 428 can deny the request to run the application.

Operation 1022 of FIG. 10 shows sending, via the shared region of memory, virtual desktop configuration information to the virtual machine. For example, and again turning to FIG. 6, shared region of memory 602 can be used to transport configuration information for setting up a virtual desktop session from virtualization platform 402 to virtual machine 414. In a specific example, virtual desktop manager 430 can generate configuration information in response to receiving a connection request from broker server 508. For example, broker server 508 could receive a connection request from client 514 and obtain a username/password combination. Broker server 508 could send the username/password combination to virtual desktop manager 430, which can run and generate one or more packets of configuration information that can cause configuration service 434 to configure guest operating system 428 in order to conduct a virtual desktop session with client 514.

Refinement 1024 of FIG. 10 illustrates that in an embodiment the virtualization platform is assigned to a first networking domain and the guest operating system is assigned to a second networking domain. For example, and turning to FIG. 5, in an embodiment of the present disclosure virtualization platform 402 can be assigned to a first networking domain, e.g., the infrastructure domain 520, and guest operating system 428 can be assigned to a second networking domain. For example, guest operating system 428 could be assigned to a domain of a company that pays the entity that maintains the datacenter a monthly fee to provide their employees with virtual desktop sessions. In this example, a company may provide their employees with computer systems with thin clients and the employees may connect to virtual desktop server 400 when they arrive to work.

Refinement 1026 of FIG. 10 illustrates that in an embodiment the virtualization platform is assigned to a first networking domain and the guest operating system is assigned to a collection of computers on a local area network. Similar to refinement 1024, virtualization platform 402 can be assigned to a first networking domain, e.g., infrastructure domain 520, and guest operating system 428 can operate as a part of a workgroup. A workgroup does not have servers and clients; rather a workgroup is more like a peer-to-peer network. Or put another way, guest operating system 428 may not belong to a domain, but instead be connected to a local area network peer-to-peer network.

Figure 11:
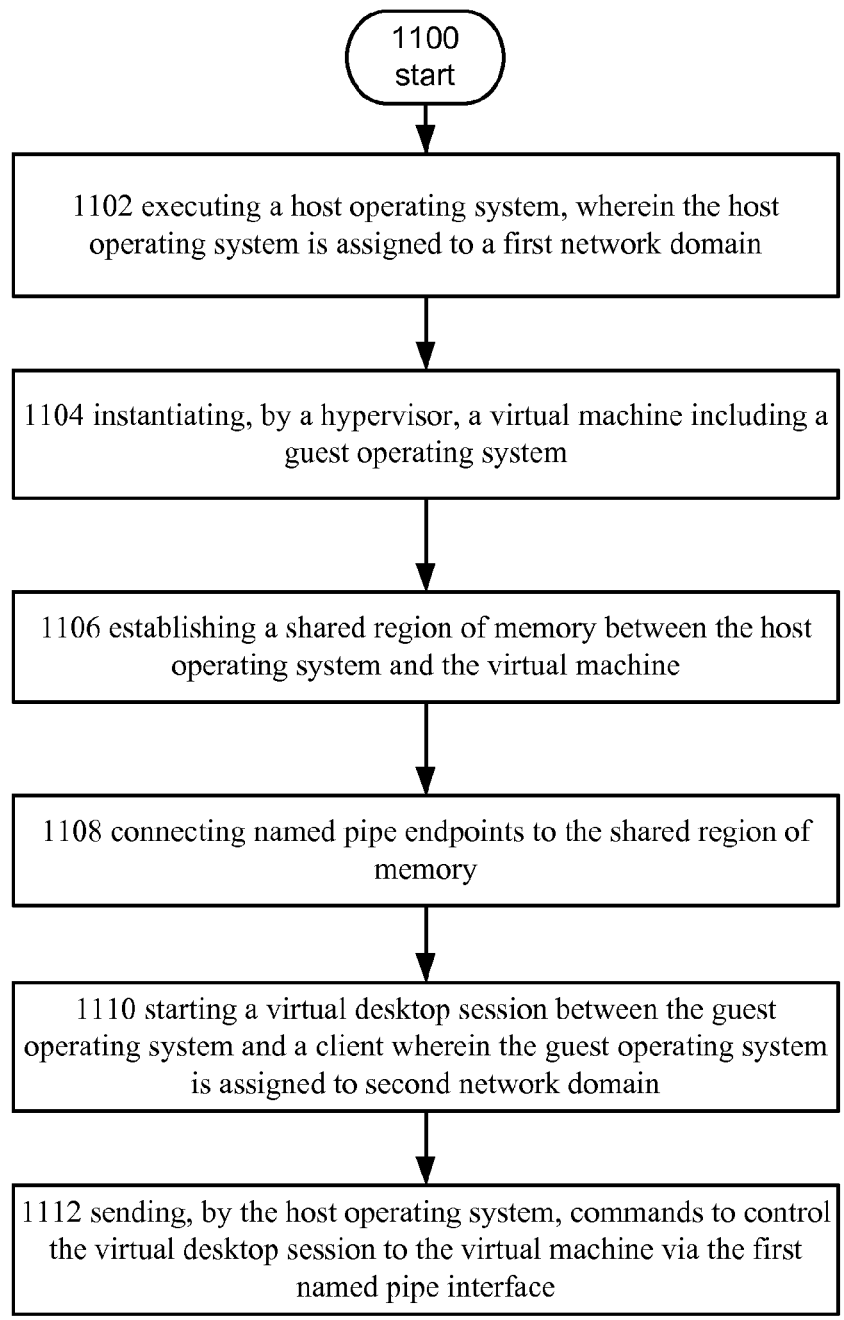
FIG. 11 depicts an operational procedure.

Turning now to FIG. 11, it shows an operational procedure for deploying virtual desktop sessions including operations 1100, 1102, 1104, 1106, 1108, 1110, and 1112. Operation 1100 begins the operational procedure and operation 1102 shows executing a host operating system, wherein the host operating system is assigned to a first network domain. For example, in an exemplary embodiment a host operating system, e.g., host 204 of FIG. 2, can execute on a logical processor. Referring to FIG. 4, in this exemplary embodiment virtualization platform 402 can be implemented using an architecture similar to that described above with respect to FIG. 2. In a specific example, virtual desktop manager 430 can be implemented as a user mode process that executes within a host operating system that runs within a parent partition. The host operating system in this example can be assigned to a first network domain, e.g., infrastructure domain 520. In this example a user account identifier that is stored on an active directory server for infrastructure domain 520 can be logged into the host operating system.

Continuing with the description of FIG. 11, operation 1104 shows instantiating, by a hypervisor, a virtual machine including a guest operating system. For example, a hypervisor, e.g., microkernel hypervisor 202 of FIG. 2, can instantiate virtual machine 414. For example, virtual desktop manager 430 can issue a request to start virtual machine 414 and the hypervisor can load virtual machine 414 from storage into a child partition and boot guest operating system 428, which can execute on a virtual processor and run configuration service 434 and remote presentation engine 406.

Turning to operation 1106, it shows establishing a shared region of memory between the host operating system and the virtual machine. For example, an inter-partition communication channel 404 can be implemented at least in part by shared region of memory 602 shared between a host operating system and virtual machine 414. In this exemplary embodiment, the host operating system can instantiate virtual desktop service provider 604. Virtual desktop service provider 604 can inject a device identifier into an area of memory mapped to IO devices and a plug-and-play module running in guest operating system 428 can detect the device identifier and load virtual desktop service client 606. Virtual desktop service client 606 can execute on a virtual processor and configure setup shared region of memory 602 so that virtual desktop service provider 604 can access it. Virtual desktop service client 606 can execute on a virtual processor and write a control packet to shared region of memory 602, which can be detected by virtual desktop service provider 604 and the channel can be opened.

Turning to operation 1108, it shows connecting named pipe endpoints to the shared region of memory. For example, and turning to FIG. 5, in an exemplary embodiment, host operating system can execute on a logical processor and execute instructions that cause server named pipe endpoint 608 to be loaded into memory and connected to virtual desktop service provider 604. Within virtual machine 414, virtual desktop service client 606 can execute on a virtual processor and cause client named pipe endpoint 610 to load and connect. In this exemplary embodiment, virtual desktop 430 and configuration service 434, or any other application that includes code operable to connect to a named pipe, can pass messages from virtualization platform 402 to guest operating system 428 via shared region of memory 602. In an alternative embodiment, the named pipe endpoints (608 and 610) can be configured to interface directly with shared region of memory. In this configuration the functionality of virtual desktop service provider 604 and virtualization service client 606 would be subsumed into named pipe endpoints (608 and 610).

Turning to operation 1110, it shows starting a virtual desktop session between the guest operating system and a client wherein the guest operating system is assigned to second network domain Turning to FIG. 5, remote presentation engine 406 can monitor a port for a connection request from client 514. In response to receiving a request, remote presentation engine 406 can start a virtual desktop session with client 514 and start streaming packets of data indicative of a graphical user interface for guest operating system 428 to client 514. For example, and turning to FIG. 5, in an embodiment of the present disclosure virtualization platform 402 can be assigned to a first networking domain, e.g., the infrastructure domain 520, and guest operating system 428 can be assigned to a second networking domain.

Turning to operation 1112, it shows sending, by the host operating system, commands to control the virtual desktop session to the virtual machine via the first named pipe interface. For example, virtual desktop manager 430 can receive requests from an administrator and send commands to configuration service 434 via inter-partition communication channel 404. In an exemplary embodiment, the commands can include, but are not limited to commands for shutting down guest operating system 428, disconnecting the user, resetting guest operating system 428, etc. Configuration service 434 can receive the commands and take the appropriate action. For example, if the command is to log the user off guest operating system 428, configuration service 434 can access a remote logoff application program interface of guest operating system 428 and log the user off. Similarly, configuration service 434 can access an application program interface of guest operating system 428 to disconnect a user or reset guest operating system 428.

Figure 12:
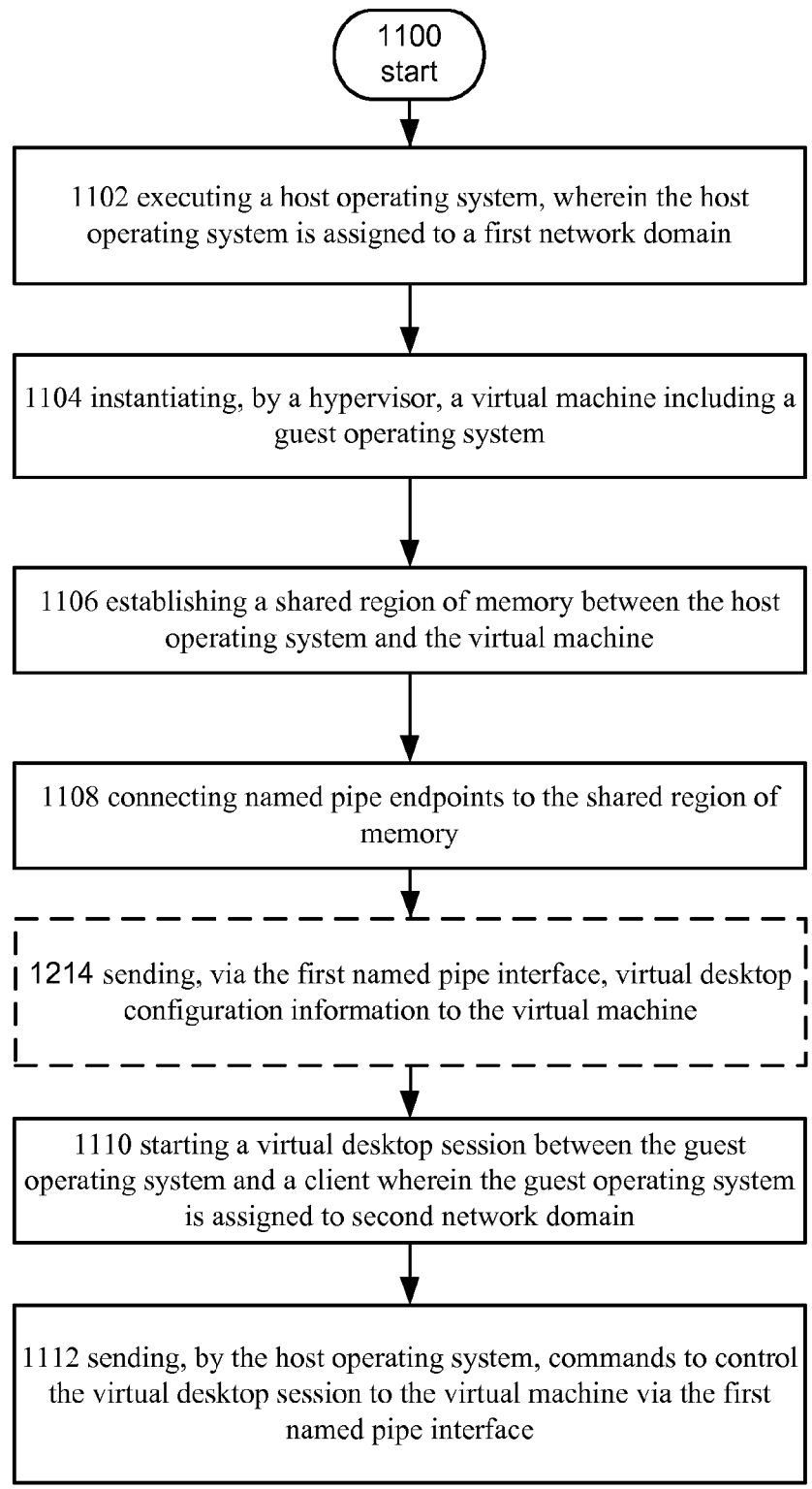
FIG. 12 depicts an alternative embodiment of the operational procedure of FIG. 11.

Referring to FIG. 12, it shows an alternative embodiment of the operational procedure illustrated by FIG. 11. FIG. 12 includes the additional operation 1214, which illustrates sending, via the first named pipe interface, virtual desktop configuration information to the virtual machine. For example, and again turning to FIG. 6, shared region of memory 602 can be used to transport configuration information for setting up a virtual desktop session from virtualization platform 402 to virtual machine 414. In this example, named pipe endpoints (608 and 610) can be connected to virtual desktop service provider 604 and virtual desktop service client 606. Virtual desktop manager 430 can be configured to use server named pipe endpoint 608 to send configuration information to configuration service 434. In a specific example, virtual desktop manager 430 can receive a request to start guest operating system 428 from broker server 508. In this specific example, the request could include a username to be added to a list of administrators on guest operating system 428. In this example, virtual desktop manager 430 can send a message that includes a command to add the username to the list of administrator accounts for guest OS 428 to server named pipe endpoint 608 using named pipe inter-process communication code. Named pipe endpoint 608 can translate the message into a format that virtual desktop service provider 604 can process and route the message. Virtual desktop service provider 604 can write the message to region of shared memory 602. Virtual desktop service client 606 can detect the message and retrieve it from region of shared memory 602. Virtual desktop service client 606 can send the message to client named pipe endpoint 610, which can translate the message into a format that can be processed by name pipe code running in configuration service 434 and route the message. In this example, configuration service 434 can receive the message; and add the username to the administrator list for guest operating system 428 via an application program interface.

The foregoing detailed description has set forth various embodiments of the systems and/or processes via examples and/or operational diagrams. Insofar as such block diagrams, and/or examples contain one or more functions and/or operations, it will be understood by those within the art that each function and/or operation within such block diagrams, or examples can be implemented, individually and/or collectively, by a wide range of hardware, software, firmware, or virtually any combination thereof.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein.

What is claimed is:

1. A computer system configured to deploy a virtual desktop session, comprising:
   a processor;
   a memory coupled to the processor, the memory including computer-executable instructions that upon execution cause the system at least to:
   establish an inter-partition communication channel between a virtualization platform that supports execution of a virtual machine and the virtual machine including a guest operating system, the inter-partition communication channel comprising a virtual device attached to a virtual motherboard of the virtual machine, a device identifier of the virtual device being provided to the virtual machine by the virtualization platform,
      the virtual machine being configured to automatically trust messages received via the inter-partition communication channel without authenticating the messages;
   send, via the inter-partition communication channel, virtual desktop configuration information to the virtual machine;
   configure the guest operating system in accordance with the received virtual desktop configuration information; and
   establishing the virtual desktop session with a client.

2. The computer system of claim 1, wherein the memory further comprises computer-executable instructions that upon execution cause the system at least to:
   send a virtual machine internet protocol address received from the virtual machine via the inter-partition communication channel to the client.

3. The computer system of claim 1, wherein the memory further comprises computer-executable instructions that upon execution cause the system at least to:
   receive a command from the virtual machine via the inter-partition communication channel, wherein the command specifies a time to execute the guest operating system for downloading a guest operating system patch.

4. The computer system of claim 1, wherein the virtual desktop configuration information includes a command to enable virtual desktop sessions.

5. The computer system of claim 1, wherein the virtual desktop configuration information includes a command to add a user account associated with the client to a list of allowed virtual desktop users.

6. The computer system of claim 1, wherein the virtual desktop configuration information includes a command to add a user account associated with the client to an administrator group for the guest operating system.

7. The computer system of claim 1, wherein the virtual desktop configuration information includes a command to open a network port used by the virtual desktop session to receive user input from the client.

8. The computer system of claim 1, wherein the virtual desktop configuration information includes a command to set guest operating system firewall settings.

9. A method for deploying a virtual desktop session, comprising:
   establishing an inter-partition communication channel between a virtualization platform that supports execution of a virtual machine and the virtual machine including a guest operating system, the inter-partition communication channel comprising a virtual device attached to a virtual motherboard of the virtual machine, a device identifier of the virtual device being provided to the virtual machine by the virtualization platform, the virtual machine being configured to automatically trust messages received via the inter-partition communication channel without authenticating the messages;

sending, via the inter-partition communication channel, virtual desktop configuration information to the virtual machine;

configuring the guest operating system in accordance with the virtual desktop configuration information; and establishing the virtual desktop session with a client.

10. The method of claim 9, further comprising:

sending a virtual machine internet protocol address received from the virtual machine via the inter-partition communication channel to the client.

11. The method of claim 9, further comprising:

receiving a command from the virtual machine via the inter-partition communication channel, wherein the command specifies a time to execute the guest operating system for downloading a guest operating system patch.

12. The method of claim 9, wherein the virtual desktop configuration information includes a command to enable virtual desktop sessions.

13. The method of claim 9, wherein the virtual desktop configuration information includes a command to add a user account associated with the client to a list of allowed virtual desktop users.

14. The method of claim 9, wherein the virtual desktop configuration information includes a command to add a user account associated with the client to an administrator group for the guest operating system.

15. The method of claim 9, wherein the virtual desktop configuration information includes a command to open a network port used by the virtual desktop session to receive user input from the client.

16. The method of claim 9, wherein the virtual desktop configuration information includes a command to set guest operating system firewall settings.

17. A computer-readable storage device for deploying a virtual desktop session, bearing computer-executable instructions, that when executed by a computer at least cause:

establishing an inter-partition communication channel between a virtualization platform that supports execution of a virtual machine and the virtual machine including a guest operating system, the inter-partition communication channel comprising a virtual device attached to a virtual motherboard of the virtual machine, a device identifier of the virtual device being provided to the virtual machine by the virtualization platform, the virtual machine being configured to automatically trust messages received via the inter-partition communication channel without authenticating the messages;

sending, via the inter-partition communication channel, virtual desktop configuration information to the virtual machine;

configuring the guest operating system in accordance with the virtual desktop configuration information; and establishing the virtual desktop session with a client.

18. The computer-readable storage device of claim 17, further bearing computer-executable instructions, that when executed by the computer at least cause:

sending a virtual machine internet protocol address received from the virtual machine via the inter-partition communication channel to the client.

19. The computer-readable storage device of claim 17, further bearing computer-executable instructions, that when executed by the computer at least cause:

receiving a command from the virtual machine via the inter-partition communication channel, wherein the command specifies a time to execute the guest operating system for downloading a guest operating system patch.

20. The computer-readable storage device of claim 17, wherein the virtual desktop configuration information includes a command to enable virtual desktop sessions.

* * * * *